(12) United States Patent
Van Der Blom

(10) Patent No.: US 7,421,939 B2
(45) Date of Patent: Sep. 9, 2008

(54) COMBINATION OF A CHAMBER AND A PISTON, A PUMP, A MOTOR, A SHOCK ABSORBER AND A TRANSDUCER INCORPORATING THE COMBINATION

(76) Inventor: Nicolaas Van Der Blom, Gaerdet 12, 3460 Birkerod (DK)

( * ) Notice: Subject to any disclaimer, the term of this patent is extended or adjusted under 35 U.S.C. 154(b) by 317 days.

(21) Appl. No.: 10/473,080

(22) PCT Filed: Mar. 27, 2002

(86) PCT No.: PCT/DK02/00216

§ 371 (c)(1),
(2), (4) Date: Jan. 5, 2004

(87) PCT Pub. No.: WO02/077457

PCT Pub. Date: Oct. 3, 2002

(65) Prior Publication Data

US 2004/0149124 A1 Aug. 5, 2004

(30) Foreign Application Priority Data

Mar. 27, 2001 (DK) ............................... 2001 00506
Mar. 27, 2001 (DK) ............................... 2001 00507

(51) Int. Cl.
*F01B 31/00* (2006.01)
(52) U.S. Cl. ............................... 92/6 R; 92/247; 92/250
(58) Field of Classification Search .................... 92/6 R, 92/6 D, 193, 247, 250
See application file for complete search history.

(56) References Cited

U.S. PATENT DOCUMENTS

| 1,536,426 A | * | 5/1925 | Deakins et al. | ............... 92/250 |
| 1,678,365 A | * | 7/1928 | Sutliff | ........................ 92/250 |
| 2,710,077 A | * | 6/1955 | Fabel et al. | .................. 92/193 |

FOREIGN PATENT DOCUMENTS

| GB | 2023715 | 1/1980 |
| GB | 2070731 | 9/1981 |
| WO | 0065235 | 11/2000 |
| WO | 0070227 | 11/2000 |

* cited by examiner

Primary Examiner—F. Daniel Lopez
(74) Attorney, Agent, or Firm—Notaro & Michalos P.C.

(57) ABSTRACT

A piston-chamber combination comprising an elongate chamber which is bounded by an inner chamber wall and comprising an elastically deformable piston comprising a container in said chamber to be sealingly movable relative to said chamber at least between first and second longitudinal positions of said chamber, said chamber having cross-sections of different cross-sectional areas at the first and second longitudinal positions of said chamber and at least substantially continuously different cross-sectional areas at intermediate longitudinal positions between the first and second longitudinal positions thereof, the cross-sectional area at the first longitudinal position being larger than the cross-sections area at the second longitudinal position, said piston including a piston body and sealing means supported by the piston body being designed to adapt itself and said sealing means to said different cross-sectional areas of said chamber during the relative movements of said pistion from the second longitudinal position through said intermediate longitudinal positions to the first longitudinal position of said chamber.

43 Claims, 24 Drawing Sheets

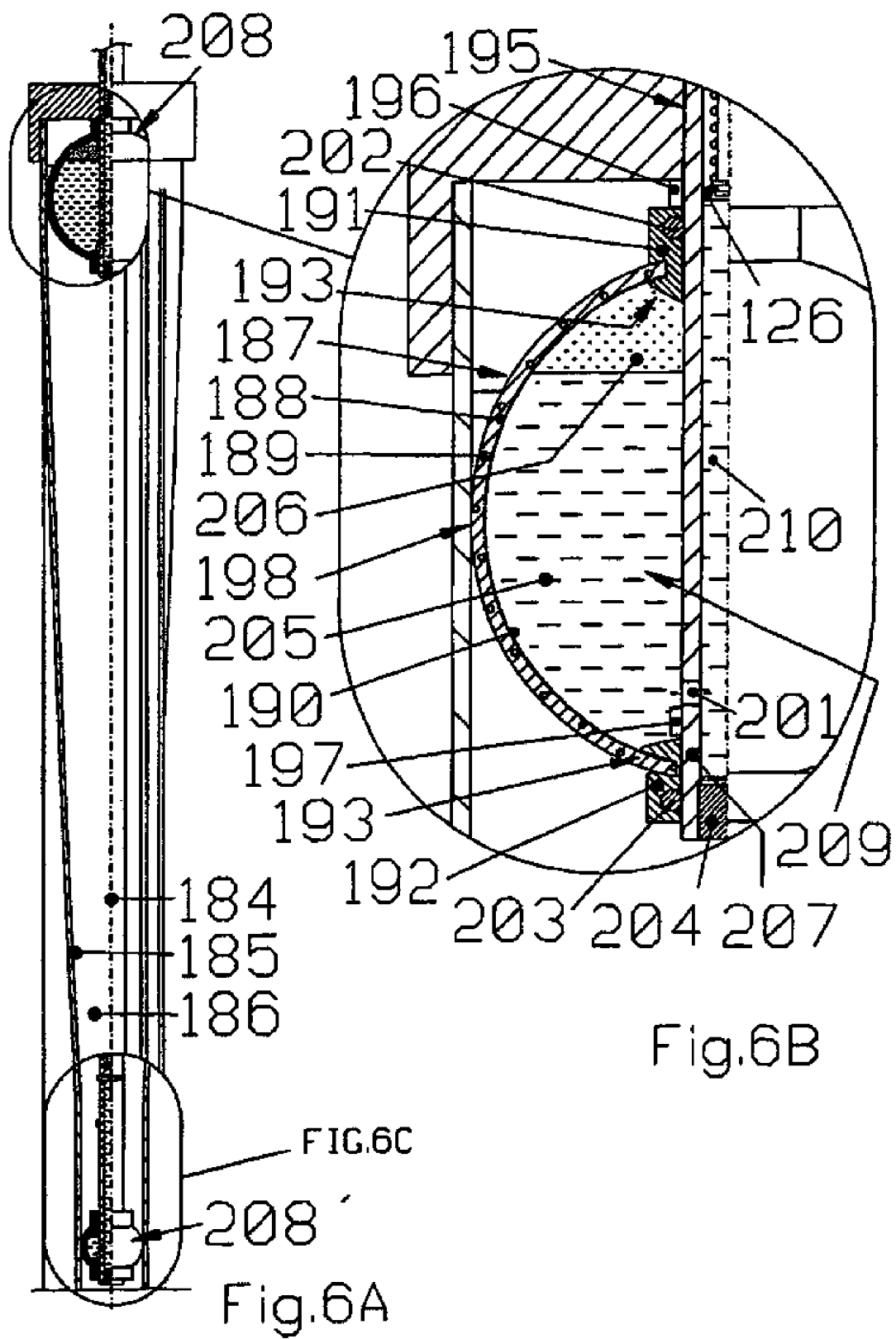

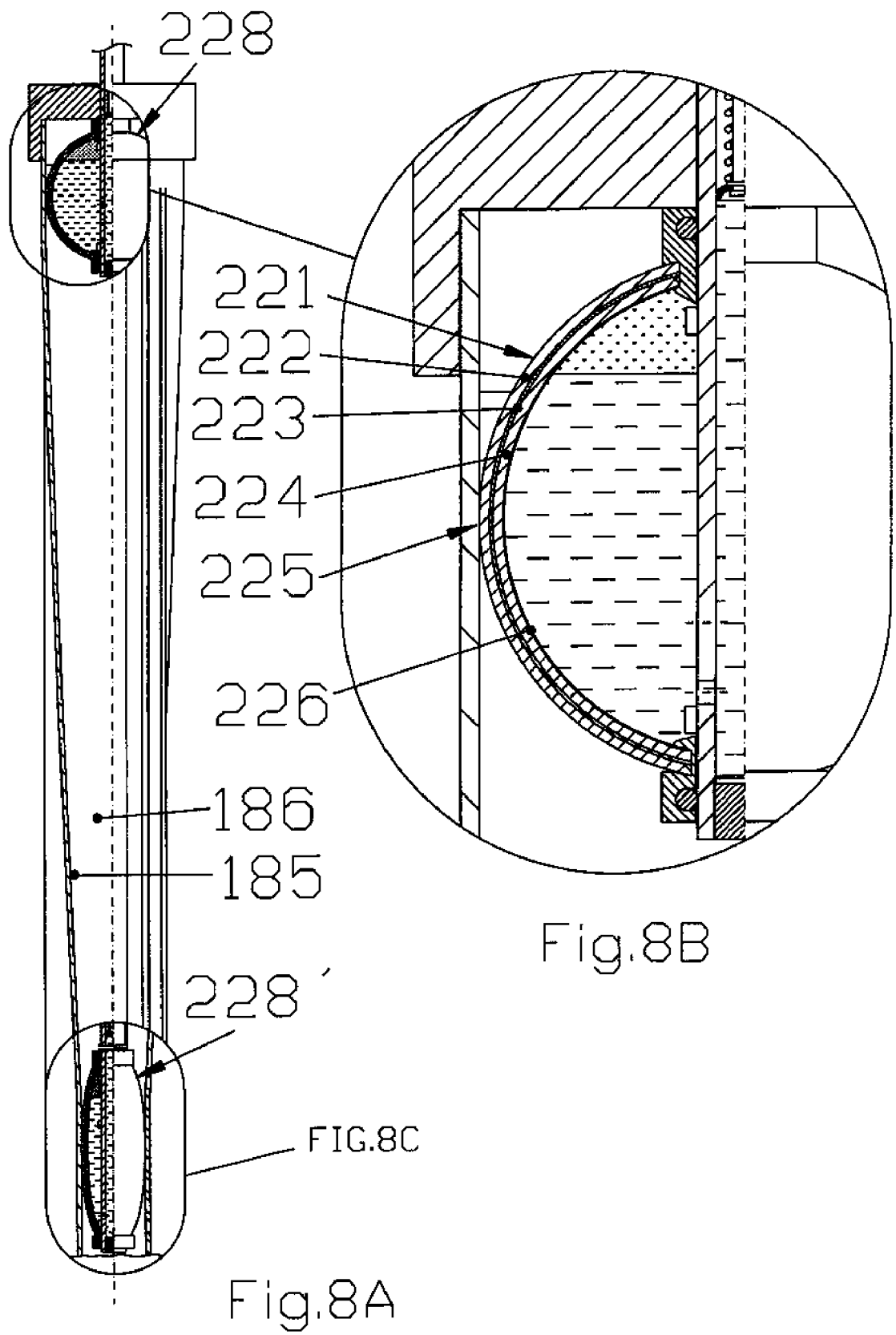

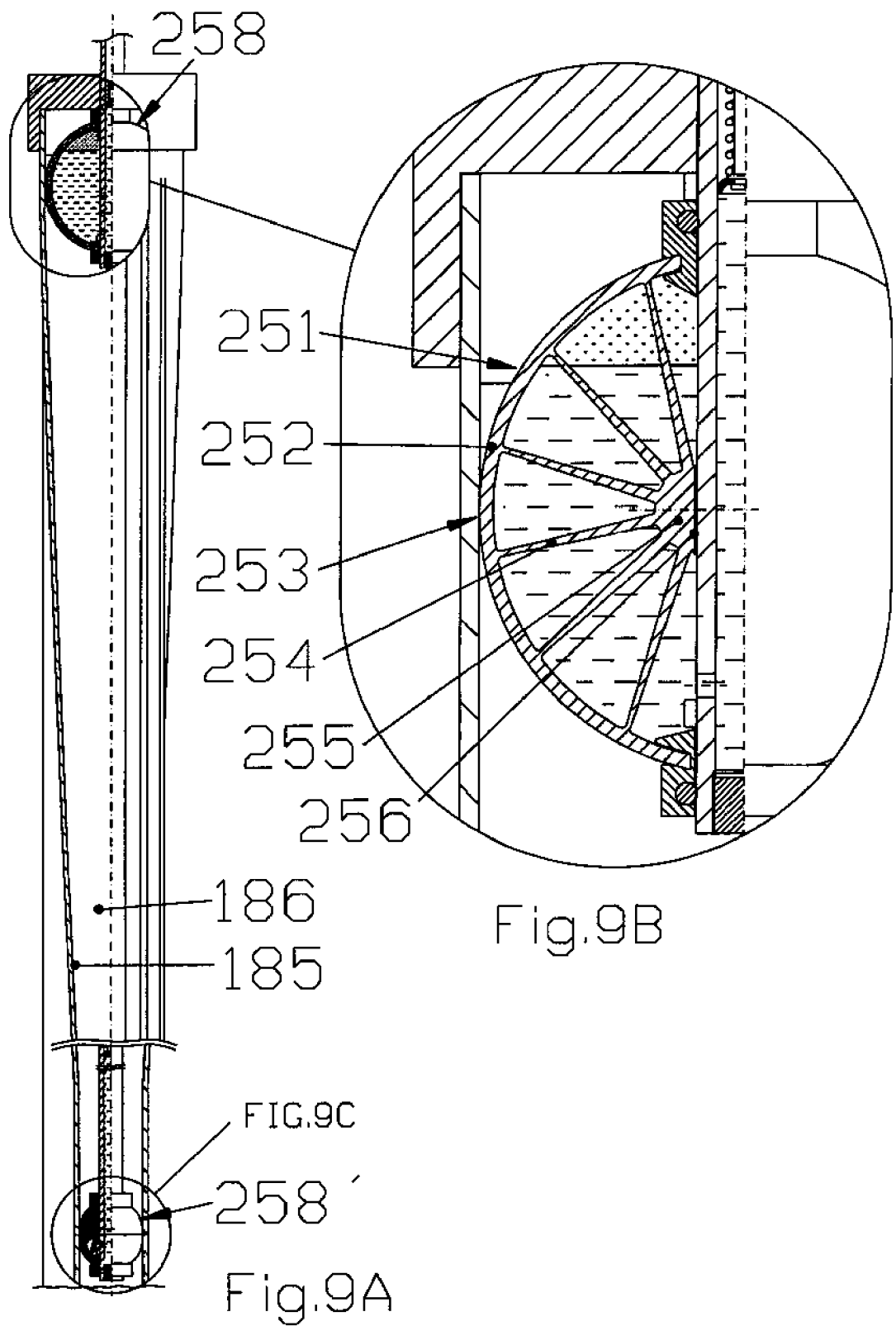

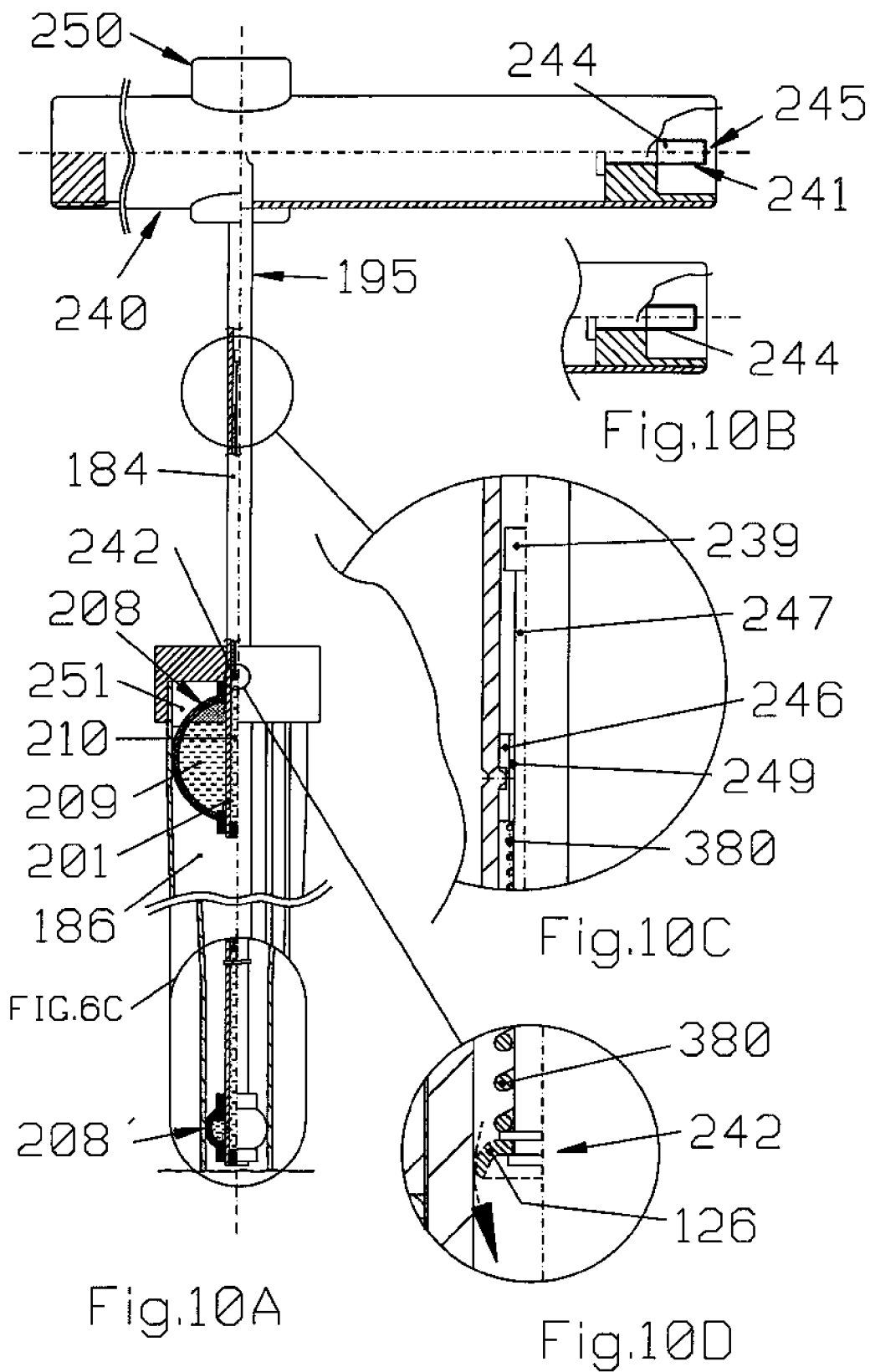

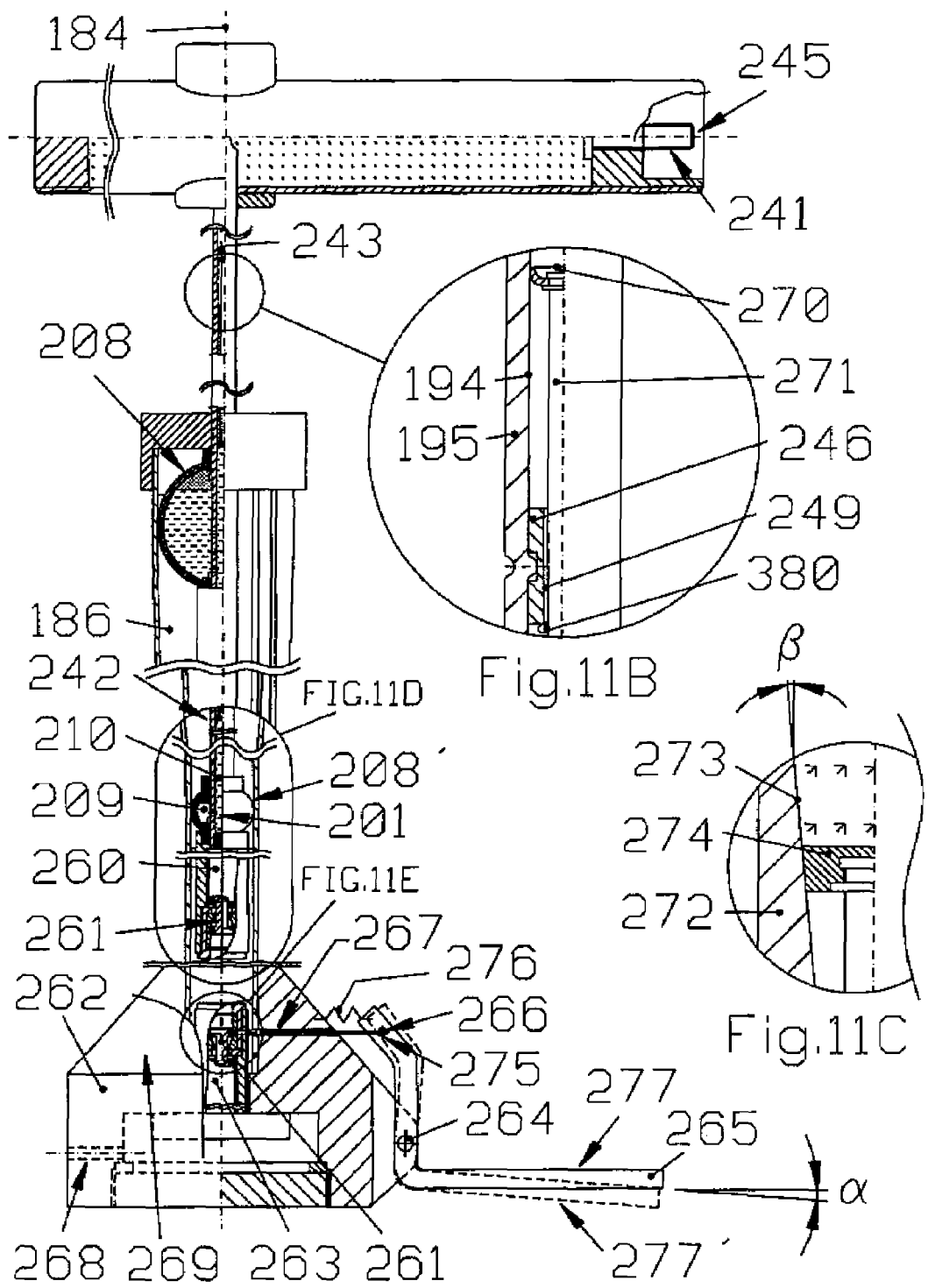

COMBINATION OF A CHAMBER AND A PISTON, A PUMP, A MOTOR, A SHOCK ABSORBER AND A TRANSDUCER INCORPORATING THE COMBINATION

TECHNICAL FIELD

A piston-chamber combination comprising an elongate chamber which is bounded by an inner chamber wall, and comprising a piston in said chamber to be sealingly movable relative to said chamber wall at least between a first longitudinal position and a second longitudinal positions of the chamber, said chamber having cross-sections of different cross-sectional areas and different circumferential lengths at the first and second longitudinal positions and at least substantially continuously different cross-sectional areas and different circumferential length at intermediate longitudinal positions between the first and second longitudinal positions, the cross-sectional area and circumferential length at said second longitudinal position being smaller than the cross-sectional area and circumferential length at said first longitudinal position, said piston comprising a container which is elastically deformable thereby providing for different cross-sectional areas and circumferential lengths of the piston adaptating the same to said different cross-sectional areas and different circumferential lengths of the chamber during the relative movements of the piston between the first and second longitudinal positions through said intermediate longitudinal positions of the chamber.

Inflation valves are the Dunlop-Woods valve, the Sclaverand valve and the Schrader valve. These are in use for inflation of closed chambers, e.g. tyres of vehicles. The last two mentioned valve types have a spring-force operated valve core pin, and may be opened by depressing this pin for inflation and deflation of the chamber. Depressing the valve core pin may be done by manual activation, by a pressure of a fluid or by a valve actuator. The first two mentioned valve types may be opened by the pressure of a fluid alone, while the last mentioned one best may be opened by a valve actuator, as otherwise a high pressure may be needed to depress the pin.

BACKGROUND OF THE INVENTION

This invention deals with solutions for the problem of obtaining a friction force low enough to at least avoid jamming between a piston, specifically a piston comprising a container having an elastically deformable container wall, and the wall of an elongate chamber during the stroke, the chamber having different sizes of cross-sectional area's in its longitudinal direction, specifically those having different circumferential length's, when the piston is sealingly movable relative to said chamber.

A problem with embodiments of FIGS. 6, 8 and 9-12 (incl.) of WO 00/70227 may be that the piston may jam in the smaller cross-sections of the chamber having cross-sections with different circumferential sizes. Jamming may occur due to high frictional forces of the material of the wall of the pistons. These forces may mainly be created by the compression of the material(s) of the wall of the piston when the piston is moving from a first longitudinal position in the chamber having the biggest cross-sectional area to a second longitudinal position where the cross-sectional area and the circumferential size is smaller. FIGS. 1-3 (incl.) of the current patent application show examples of high frictional forces for non-moving pistons comprising a container in a non-moving chamber with or without internal pressure in the chamber. This results in high contact pressures between the piston and the wall of the chamber: jamming may occur.

A further problem may be that embodiments of pistons comprising a container of WO 00/70227 may leak their fluid, and thus may change their sealing capability. As in the solutions of the earlier mentioned problem for pistons comprising a container with an elastically deformable wall the sealing force is created by internal pressure, leakage may be an important problem.

OBJECT OF THE INVENTION

The object is to provide combinations of a piston and a chamber which may sealingly move when the chambers have different cross-sectional areas when the circumferences of these cross-sections are different.

SUMMARY OF THE INVENTION

In the first aspect, the invention relates to a combination of a piston and a chamber, wherein:
the the piston is produced to have a production size of the container in the stress-free and undeformed state thereof in which the circumferential length of the piston is approximately equivalent to the circumferential length of said chamber at said second longitudinal position, the container being expandable from its production size in a direction transversally with respect to the longitudinal direction of the chamber thereby providing for an expansion of the piston from the production size thereof during the relative movements of the piston from said second longitudinal position to said first longitudinal position.

In the present context, the cross-sections are preferably taken perpendicularly to the longitudinal axis (=transversal direction).

Preferably, the second cross-sectional area is 95-15%, such as 95-70% of the first cross-sectional area. In certain situations, the second cross-sectional area is approximately 50% of the first cross-sectional area.

A number of different technologies may be used in order to realise this combination. These technologies are described further in relation to the subsequent aspects of the invention.

One such technology is one wherein the piston comprises an elastically deformable container comprising a deformable material.

In that situation, the deformable material may be a fluid or a mixture of fluids, such as water, steam, and/or gas, or a foam. This material, or a part thereof, may be compressible, such as gas or a mixture of water and gas, or it may be at least substantially incompressible.

This may be achieved by choosing the production size (stress free, undeformed) of the piston approximately equivalent to the circumferential length of the smallest cross-sectional area of a cross-section of the chamber, and to expand it when moving to a longitudinal position with a bigger And this may be achieved by providing means to keep a certain sealing force from the piston on the wall of the chamber: by keeping the internal pressure of the piston on (a) certain predetermined level(s), which may be kept constant during the stroke. A pressure level of a certain size depends on the difference in circumferential length of the cross sections, and on the possibility to get a suitable sealing at the cross section with the smallest circumferential length. If the difference is big, and the appropriate pressure level too high to obtain a suitable sealing force at the smallest circumferential length, than change of the pressure may be arranged during the stroke. This calls for a pressure management of the piston. As commercially used materials are normally not tight, specifically when quite high pressures may be used, there must be a possibility to keep this pressure, e.g. by using a valve for inflation purposes.

When the cross-sectional area of the chamber changes, the volume of the container may change. Thus, in a cross-section through the longitudinal direction of the chamber the container may have a first shape at the first longitudinal direction and a second shape at the second longitudinal direction, the first shape may be different from the second shape. In one situation, at least part when the deformable material is compressible and the first shape has an area being larger than an area of the second shape. In that situation, the overall volume of the container changes, whereby the fluid should be compressible. Alternatively or optionally, the piston may comprise an enclosed space communicating with the deformable container, said enclosed space having a variable volume. In that manner, that the enclosed space may take up or release fluid when the deformable container changes volume. The change of the volume of the container is by that automatically adjustable. It may result in that the pressure in the container remains constant during the stroke.

Also, the enclosed space may comprise a spring-biased piston. This spring may define the pressure in the piston when changing its volume.

The volume of the enclosed space may be varied. In that manner, the overall pressure or maximum/minimum pressure of the container may be altered.

When the enclosed space is updivided into a first and a second enclosed space, the spaces further comprising means for defining the volume of the first enclosed space so that the pressure of fluid in the first enclosed space may relate to the pressure in the second enclosed space. The last mentioned space may be inflatable e.g. by means of a valve, preferably an inflation valve, such as a Schrader valve.

The defining means may be adapted to define the pressure in the first enclosed space at least substantially constant during the stroke.

However, any kind of pressure level may be defined by the defining means: e.g. a pressure raise may be necessary when the container expands to such a big cross-sectional area at the first longitudinal position that the contact area at the present pressure value may become too little, in order to maintain a suitable sealing. The defining means may be a pair of pistons, one in each enclosed space. The second enclosed space may be inflated to a certain pressure level, so that a pressure raise may be communicated to the first enclosed space, despite the fact that the volume of the second enclosed space may become bigger as well. This may be achieved by e.g. a combination of a piston and a chamber with different cross-sectional area's in the piston rod, which is comprised in the second enclosed space. A pressure drop may also be designable.

Pressure management of the piston may also be achieved by relating the pressure of fluid in the enclosed space with the pressure of fluid in the chamber. By providing means for defining the volume of the enclosed space communicating with the chamber. In this manner, the pressure of the deformable container may be varied in order to obtain a suitable sealing. For example, a simple manner would be to have the defining means adapted to define the pressure in the enclosed space to raise when the container is moving from the second longitudinal position to the first longitudinal position. In this situation, a simple piston between the two enclosed spaces may be provided (in order to not loose any of the fluid in the deformable container).

In fact, the use of this piston may define any relation between the pressures in that the chamber in which the piston translates may taper in the same manner as the main chamber of the combination.

The container may be inflated by a pressure source inside the piston, or an external pressure source, like one outside the combination and/or when the chamber is the source itself. All solutions demand a valve communicating with the piston. This valve may preferably an inflation valve, best a Schrader valve. This valve type has a spring biased valve core pin and closes independant of the pressure in the piston, and all kinds of fluids may flow through it. It may however also be another valve type, e.g. a check valve.

The container may be inflated through an enclosed space where the spring-biased tuning piston operates as a check valve. The fluid may flow through longitudinal ducts in the bearing of the piston rod of the spring biased piston, from a pressure source.

When the enclosed space is divided up into a first and second enclosed space, the inflation may be done with the chamber as the pressure source, as the second enclosed space may prohibit inflation through it to the first enclosed space. The chamber may have an inlet valve in the foot of the chamber. For inflation of the container an inflation valve, e.g. a Schrader valve may be used, together with an actuator. This may be an activating pin according to WO 96/10903 or WO 97/43570, or a valve actuator according to WO99/26002. The core pin of the valve is moving towards the chamber when closing.

When the working pressure in the chamber is higher than the pressure in the piston, the piston may be inflated automatically.

When the working pressure in the chamber is lower than the pressure in the piston than it is necessary to obtain a higher pressure by e.g. temporary closing the outlet valve in the foot of the chamber. When the valve is a Schrader valve which may be opened by means of a valve actuator according to WO 99/26002, this may be achieved by creating a bypass in the form of a channel by connecting the chamber and the space between the valve actuator and the core pin of the valve. This bypass may be openened (the Schrader valve may remain closed) and closed (the Schrader valve may open) and may be accomplished by e.g. a movable piston. The movement of this piston may be arranged manually e.g. by a pedal, which is turning around an axle from an inactive position to an active position and vice versa by an operator. It may also be achieved by other means like an actuator, initiated by the result of a pressure measurement in the chamber and/or the container.

Obtaining the predetermined pressure in the container may be achieved manually—the operator being informed by a manometer which is measuring the pressure in the container. It may also be achieved automatically, e.g. by a release valve in the container. It may also be achieved by a spring-force operated cap which closes the channel above the valve actuator when the pressure exceeds a certain predetermined pressure value. Another solution is that of a comparable solution of the closable bypass of the outlet valve of the chamber—a pressure measurement may be necessary in the container, which may steer an actuator which is opening and closing the bypass of the valve actuator according to WO 99/26002 of a Schrader valve of the container at a predetermined pressure value.

The above mentioned solutions are applicable too to any pistons comprising a container, incl. those shown in WO 00/65235 and WO 00/70227.

In order to reduce the longitudinal stretching of the piston comprising a container when subjected to the pressure of the chamber, and to allow the expansion in the transversal direction, the container may comprise an elastically deformable material comprising reinforcement means, such as a textile, fibre or other reinforcement means, preferably positioned in the wall of the container. The piston comprising a container may also comprise reinforcement means which are not positioned in the wall, e.g. a plurality of elastic arms, which may or may not be inflatable, connected to the wall of the container. When inflatable, the reinforcement functions also to limit the deformation of the wall of the container due to the pressure in the chamber.

Another aspect of the invention is one relating to a combination of a piston and a chamber, wherein: the chamber defines an elongate chamber having a longitudinal axis, the piston being movable in the chamber from a second longitudinal position to a first longitudinal position, the chamber having an elastically deformable inner wall along at least part of the inner chamber wall between the first and second longitudinal positions, the chamber having, at a first longitudinal position thereof when the piston is positioned at that position, a first cross-sectional area thereof and, at a second longitudinal position thereof when the piston is positioned at that position, a second cross-sectional area, the first cross-sectional area being larger than the second cross-sectional area, the change in cross-section of the chamber being at least substantially continuous between the first and second longitudinal positions when the piston is moved between the first and second longitudinal positions.

Thus, alternatively to the combinations where the piston adapts to the cross-sectional changes of the chamber, this aspect relates to a chamber having adapting capabilities.

Naturally, the piston may be made of an at least substantially incompressible material—or a combination may be made of the adapting chamber and an adapting piston—such as a piston according to the above aspects.

Preferably, the piston has, in a cross section along the longitudinal axis, a shape tapering in a direction from the first longitudinal position to the second longitudinal position.

A preferred manner of providing an adapting chamber is to have the chamber comprise:

an outer supporting structure enclosing the inner wall and a fluid held by a space defined by the outer supporting structure and the inner wall.

In that manner, the choice of fluid or a combination of fluids may help defining the properties of the chamber, such as the sealing between the wall and the piston as well as the force required etc.

It is clear that depending on from where the combination is seen, one of the piston and the chamber may be stationary and the other moving—or both may be moving. This has no impact on the functioning of the combination.

The piston may also slide over an internal and an external wall. The internal wall may have a taper form, while the external wall is cylindrical.

Naturally, the present combination may be used for a number of purposes in that it primarily focuses on a novel manner of providing an additional manner of tailoring translation of a piston to the force required/taken up. In fact, the area/shape of the cross-section may be varied along the length of the chamber in order to adapt the combination for specific purposes and/or forces. One purpose is to provide a pump for use by women or teenagers—a pump that nevertheless should be able to provide a certain pressure. In that situation, an ergonomically improved pump may be required by determining the force which the person may provide at which position of the piston—and thereby provide a chamber with a suitable cross-sectional area/shape.

Another use of the combination would be for a shock absorber where the area/shape would determine what translation a certain shock (force) would require. Also, an actuator may be provided where the amount of fluid introduced into the chamber will provide differing translation of the piston depending on the actual position of the piston prior to the introducing of the fluid.

In fact, the nature of the piston, the relative positions of the first and the second longitudinal positions and the arrangement of any valves connected to the chamber may provide pumps, motors, actuators, shock absorbers etc. with different pressure characteristics and different force characteristics.

The preferred embodiments of the combination of a chamber and a piston have been described as examples to be used in piston pumps. This however should not limit the coverage of this invention to the said application, as it may be mainly the valve arrangement of the chamber besides the fact which item or medium may initiate the movement, which may be descisive for the type of application: pump, actuator, shock absorber or motor. In a piston pump a medium may be sucted into a chamber which may thereafter be closed by a valve arrangement. The medium may be compressed by the movement of the chamber and/or the piston and thereafter a valve may release this compressed medium from the chamber. In an actuator a medium may be pressed into a chamber by a valve arrangement and the piston and/or the chamber may be moving, initiating the movement of an attached device. In shock absorbers the chamber may be completely closed, wherein a compressable medium may be compressed by the movement of the chamber and/or the piston. In the case a non-compressable medium may be positioned inside the chamber, e.g. the piston may be equipeed by several small channels which may give a dynamic friction, so that the movement may be slowed down.

Further the invention may also be used in propulsion applications where a medium may be used to move a piston and/or a chamber, which may turn around an axis as e.g. in a motor. The principles according this invention may be applicable on all above mentioned applications. The principles of the invention may also be used in other pneumatic and/or hydraulic applications than the above mentioned piston pumps.

The various embodiments described above are provided by way of illustration only and should not be construed to limit the invention. Those skilled in the art will readily recognize various modifications, changes, and combinations of elements which may be made to the present invention without strictly following the exemplary embodiments and applications illustrated and described herein, and without departing from the true spirit and scope of the present invention.

BRIEF DESCRIPTION OF THE DRAWINGS

In the following, preferred embodiments of the invention will be described with reference to the drawings wherein:

FIG. 6A shows a longitudinal cross-section of a chamber with fixed different areas of the transversal cross-sections and a first embodiment of the piston comprising a textile reinforcement with radially-axially changing dimensions during the stroke—the piston arrangement is shown at the beginning, and at the end of a stroke—pressurized—where it has unpressurized its production size.

FIG. 6B shows an enlargement of the piston of FIG. 6A at the beginning of a stroke.

FIG. 8A shows a longitudinal cross-section of a chamber with fixed different areas of the transversal cross-sections and a third embodiment of the piston comprising a fiber reinforcement (no 'Trellis Effect') with radially-axially changing dimensions during the stroke—the piston arrangement is shown at the beginning, and at the end of a stroke where it has its production size.

FIG. 8B shows an enlargement of the piston of FIG. 8A at the beginning of a stroke.

FIG. 9A shows a longitudinal cross-section of a chamber with fixed different areas of the transversal cross-sections and a fourth embodiment of the piston comprising an "octopus" device, limiting stretching of the container wall by tentacles, which may be inflatable—the piston arrangement is shown at the beginning, and at the end of a stroke where it has its production size.

FIG. 9B shows an enlargement of the piston of FIG. 9A at the beginning of a stroke.

FIG. 10A shows the embodiment of FIG. 6 where the pressure inside the piston may be changend by inflation through e.g. a Schrader valve which is positioned in the handle and/or e.g. a check valve in the piston rod, and where an enclosed space is balancing the change in volume of the piston during the stroke.

FIG. 10B shows instead of an inflation valve, a bushing enabling connection to an external pressure source.

FIG. 10C shows details of the guidance of the rod of the check valve.

FIG. 10D shows the flexable piston of the check valve in the piston rod.

FIG. 11A shows the embodiment of FIG. 6 where the pressure inside the piston may be maintained constant during the stroke and where a second enclosed space may be inflated through a Schrader valve which is positioned in the handle, communicating with the first enclosed space through a piston arrangement—the piston may be inflated by a Schrader valve+ valve actuator arrangement with the pressure of the chamber as pressure source, while the outlet valve of the chamber may be manually controlled by a turnable pedal.

FIG. 11B shows a piston arrangement and its bearing where the piston arrangement is communicating between the second and the first enclosed space.

FIG. 11C shows a alternative piston arrangement adapting itself to the changing cross-sectional area's in its longitudinal direction inside the piston rod.

DESCRIPTION OF PREFERRED EMBODIMENTS

Figure 1A:
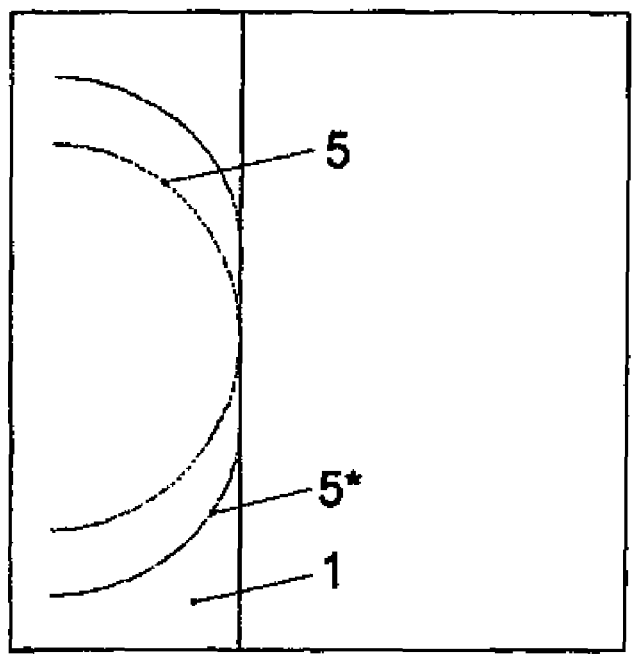
FIG. 1A shows a longitudinal cross-section of a non-moving piston in a non-pressurized cylinder at the first longitudinal position—the piston is shown in its production size, and when pressurized.

FIG. 1A shows the longitudinal cross-section of a non-moving non-pressurized piston 5 at the first longitudinal position of a non-pressurized chamber 1, having at that position a circular cross-sections with a constant radius. The piston 5 may have a production size approximately the diameter of the chamber 1 at this first longitudinal position. The piston 5* when pressurized to a certain pressure level is shown. The pressure inside the piston 5* results in a certain contact length.

Figure 1B:
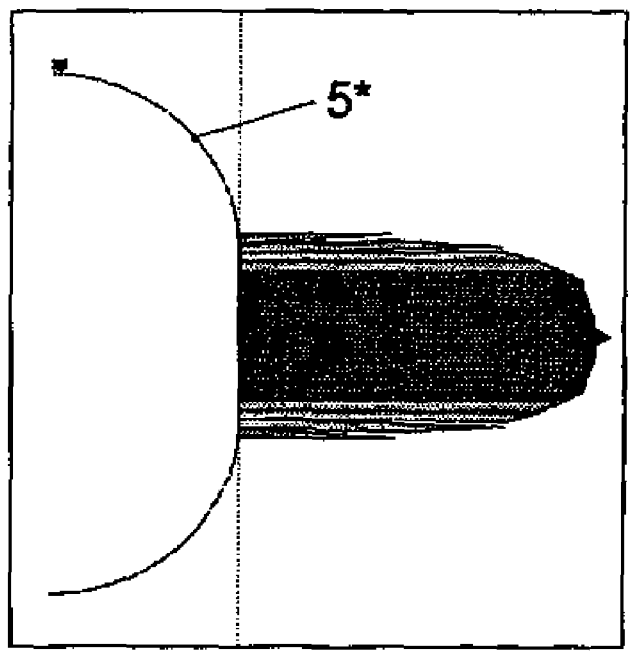
FIG. 1B shows the contact pressure of the pressurized piston of FIG. 1A on the wall of the cylinder.

FIG. 1B shows the contact pressure of the piston 5* of FIG. 1A. The piston 5* may jam at this longitudinal position.

Figure 2A:
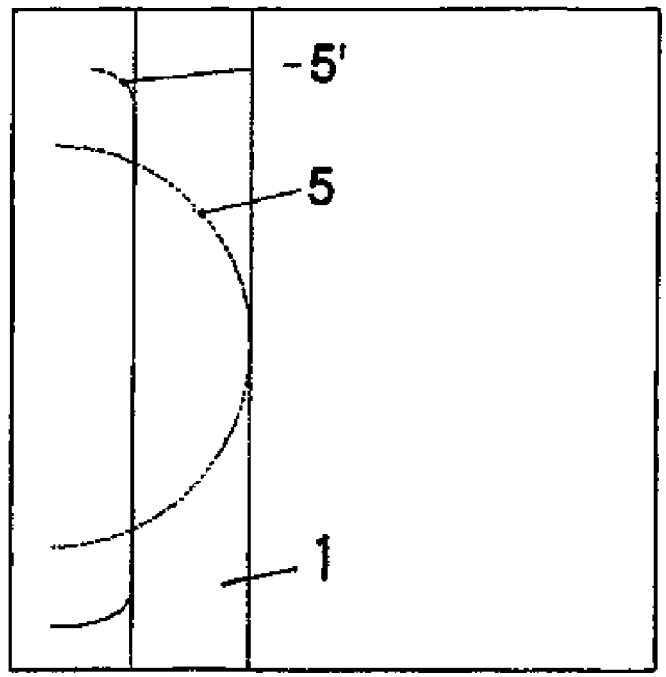
FIG. 2A shows a longitudinal cross-section of the piston of FIG. 1A in a cylinder at the first (right) and second (left) longitudinal position, the piston is non-pressurized.

FIG. 2A shows the longitudinal cross-section of a non-moving non-pressurized piston 5 at the first longitudinal position and the piston 5' at the second longitudinal position of a non-pressurized chamber 1, the chamber having circular cross-sections with a constant radius at both the first and second longitudinal positions. The piston 5 may have a production size approximately the diameter of the chamber 1 at this first longitudinal position. The piston 5' shows the piston 5, non-pressurized positioned into the smaller cross-section of the second longitudinal position.

Figure 2B:
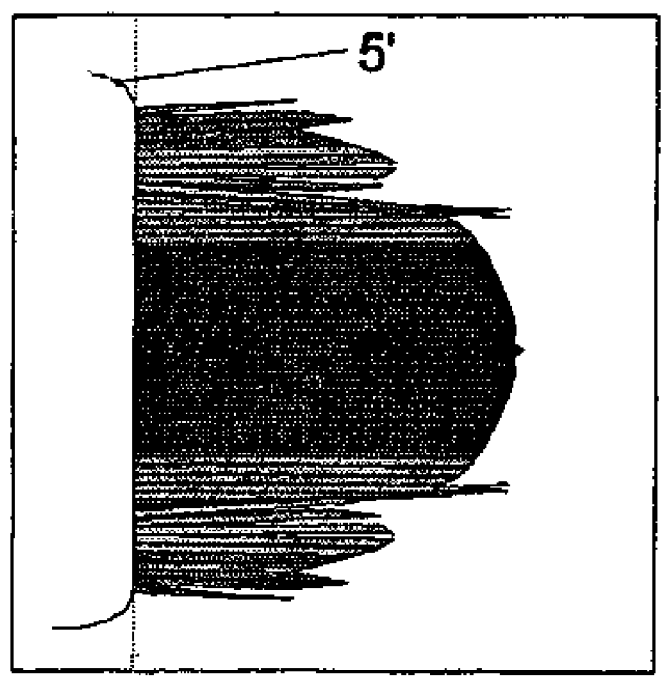
FIG. 2B shows the contact pressure of the piston of FIG. 2A on the wall of the cylinder at the second longitudinal position.

FIG. 2B shows the contact pressure of the piston 5' on the wall of the chamber at the second longitudinal position. The piston 5' may jam at this longitudinal position.

Figure 2C:
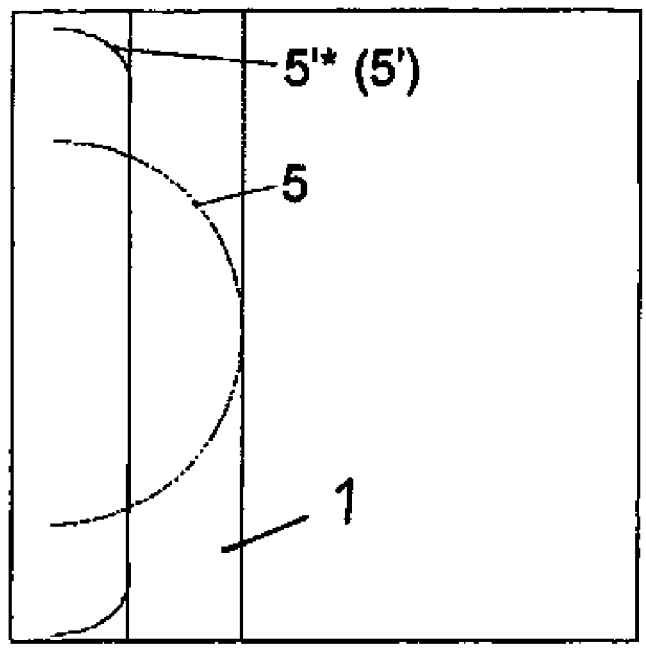
FIG. 2C shows a longitudinal cross-section of the piston of FIG. 1A in a cylinder at the second longitudinal position, the piston is pressurized on the same pressure level as the one of FIG. 1A—also is shown the piston at the first longitudinal position (production) size.

FIG. 2C shows the longitudinal cross-section of a non-moving non-pressurized piston 5 at the first longitudinal position and the piston 5' at the second position of a non-pressurized chamber 1, the chamber having circular cross-sections with a constant radius at both the first and second longitudinal positions. The piston 5 may have a production size approximately the diameter of the chamber 1 at this first longitudinal position. The piston 5'* shows the piston 5, pressurized to the same level as the one of FIG. 1A, positioned into the smaller cross-section of the second longitudinal position.

Figure 2D:
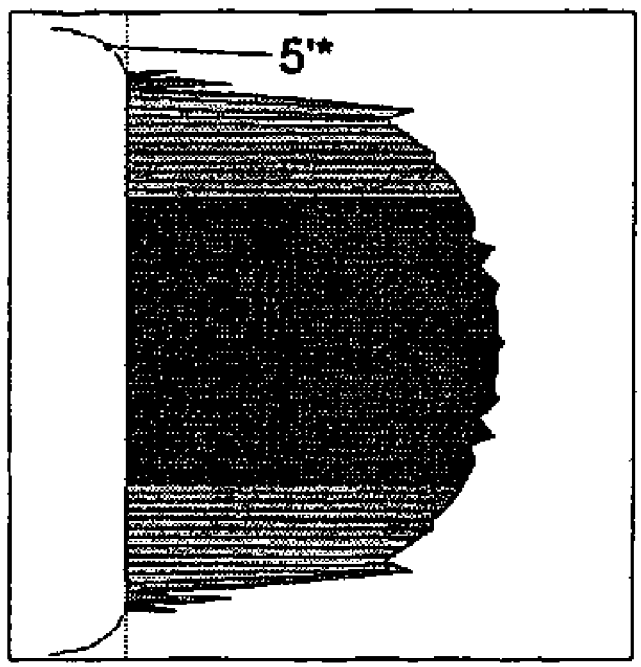
FIG. 2D shows the contact pressure of the piston of FIG. 2C on the wall of the cylinder at the second longitudinal position.

FIG. 2D shows the contact pressure of the piston 5'* on the wall of the chamber at the second longitudinal position. The piston 5'* may jam at this longitudinal position: the friction force may be 72 kg.

Figure 3A:
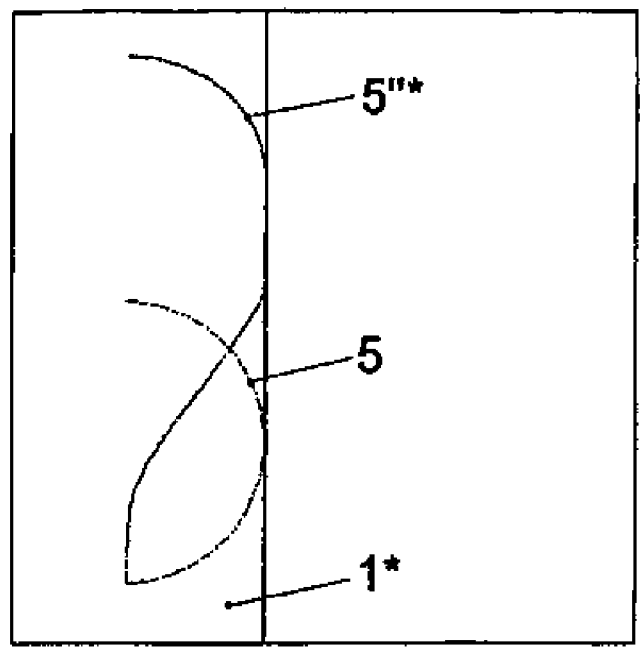
FIG. 3A shows a longitudinal cross-section of a piston of FIG. 1A in a cylinder at the first longitudinal position shown in its production size, and pressurized while the piston is subjected to a pressure in the chamber.

FIG. 3A shows the piston 5 of FIG. 1A, and the deformed piston 5'"* when pressurized to the same pressure level of that of piston 5* of FIG. 1A. The deformation is caused by the pressure in the chamber 1*, when the piston may not have means to limit the stretching, which is mainly in the meridian (longitudinal direction of the chamber) direction.

Figure 3B:
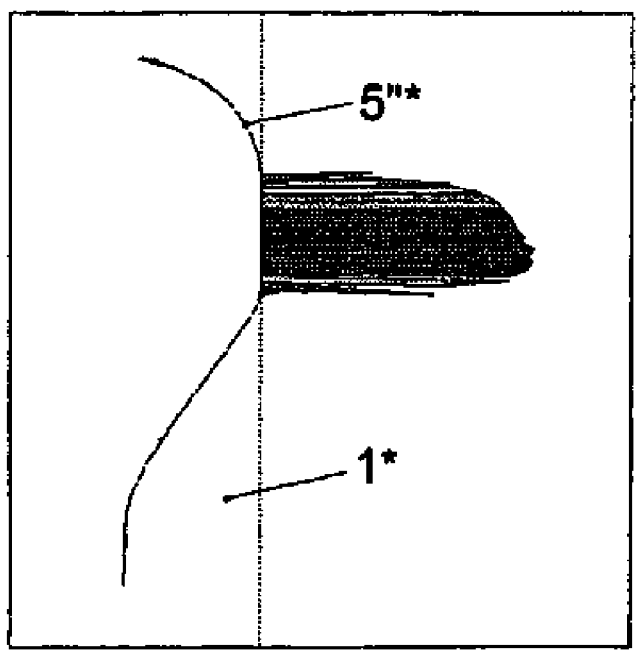
FIG. 3B shows the contact pressure of the piston of FIG. 3A on the wall of the cylinder.

FIG. 3B shows the contact pressure. The piston 5'"* may jam at this longitudinal position.

Figure 4A:
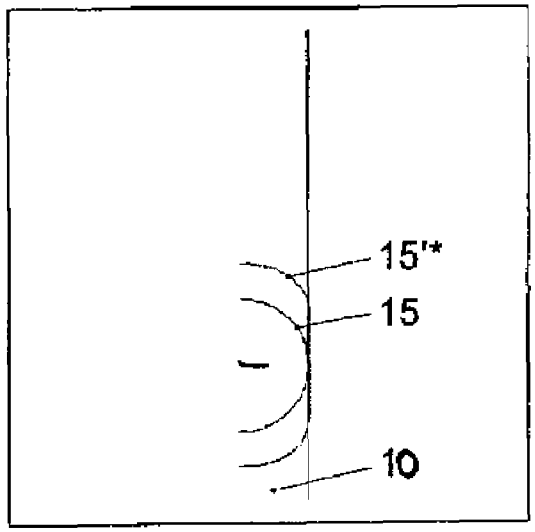
FIG. 4A shows a longitudinal cross-section of a non-moving piston according to the invention in a non-pressurized cylinder at the second longitudinal position, shown in its production size, and when pressurized to a certain level.

FIG. 4A shows the longitudinal cross-section of a piston 15 at the second longitudinal position of a non-pressurized chamber 10, having a circular cross-section. The piston 15 may have a production size approximately the diameter of the chamber 10 at this second longitudinal position. Piston 15'* shows the deformed piston 15 pressurized to a certain level. The deformation is due to the fact that the Young's modulus in the hoop direction (in a cross-sectional plane of the chamber) is choosen lower than that in the meridian direction (in the longitudinal direction of the chamber).

Figure 4B:
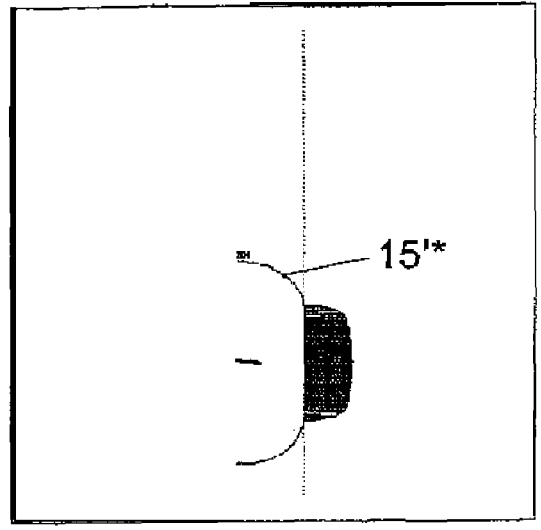
FIG. 4B shows the contact pressure of the piston of FIG. 4A on the wall of the cylinder.

FIG. 4B shows the contact pressure on the wall of piston 15'*. This results in an appropriate friction force (4.2 kg), and suitable sealing.

Figure 4C:
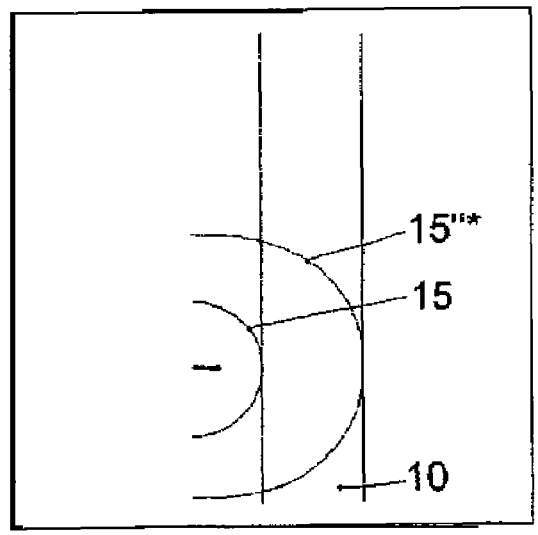
FIG. 4C shows a longitudinal cross-section of a non-moving piston according to the invention in a cylinder at the second longitudinal position, shown in its production size, and at the first longitudinal position when pressurized to the same level as that of FIG. 4A.

FIG. 4C shows the longitudinal cross-section of piston 15 at the second longitudinal position (production size) of the non-pressurized chamber 10, and when pressurized 15'"* at the first longitudinal position—the piston 15'"* may have the same pressure as when the piston 15'* is positioned at the second longitudinal position of the chamber 10 (FIG. 4A). Also here is the deformation in the hoop—and meridian direction different.

Figure 4D:
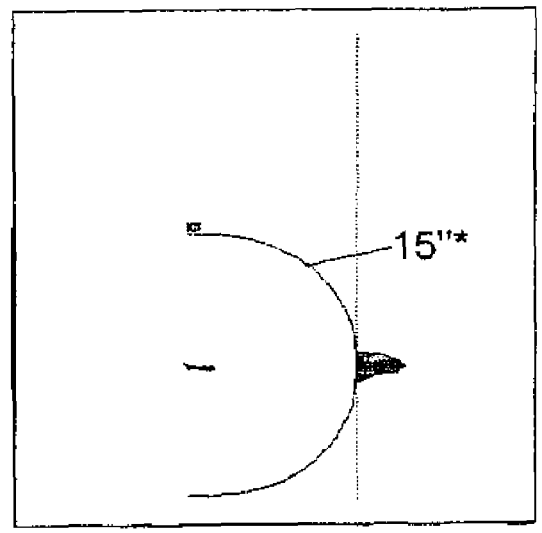
FIG. 4D shows the contact pressure of the piston of FIG. 4C on the wall of the cylinder.

FIG. 4D shows the contact pressure on the wall of piston 15'"*. This results in an appropriate friction force (0.7 kg) and a suitable sealing.

Therefore, it is possible to sealingly move a piston comprising an elastically deformable container from a smaller to a bigger cross-sectional area while having the same internal pressure—within the limitations for the diameters of the cross-sections which were chosen in this experiment.

Figure 5A:
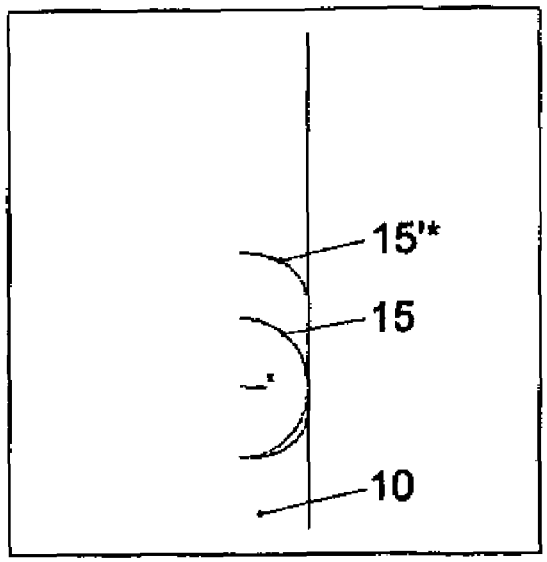
FIG. 5A shows a longitudinal cross-section of the piston of FIG. 4A in a non-pressurized cylinder at the second longitudinal position, the piston with its production size, and when pressurized.

FIG. 5A shows the longitudinal cross-section of the piston 15 (production size) and the piston 15'* at the second longitudinal position of the non-pressurized chamber 10. The piston 15'* is showing the deformed structure of piston 15 when the piston 15 is pressurized. The piston 15, 15'* have been attached at the lower end to an imaginary piston rod in order to prevent piston movement during application of the chamber pressure.

Figure 5B:
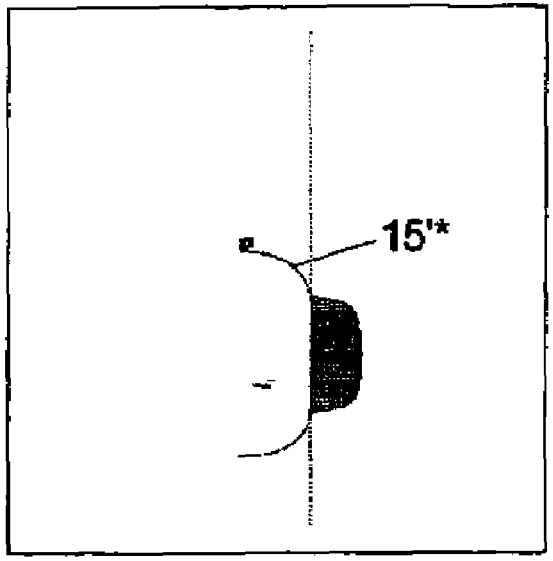
FIG. 5B shows the contact pressure of the pressurized piston of FIG. 5A on the wall of the cylinder.

FIG. 5B shows the contact pressure of the piston 15'* of FIG. 5A. This is low enough to allow movement (friction force 4.2 kg) and suitable for sealing.

Figure 5C:
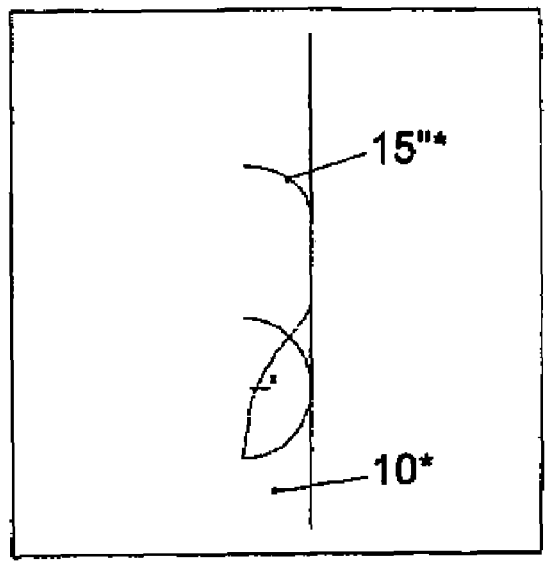
FIG. 5C shows a longitudinal cross-section of the piston of FIG. 4A in a cylinder at the second longitudinal position, the piston with its production size, and when pressurized, subjected to a pressure from the cylinder.

FIG. 5C shows the longitudinal cross-section of the piston 15 (production size) and 15'"* pressurized and deformed by the chamber pressure at the second longitudinal position of the pressurized chamber 10*. The piston 15, 15'* have been attached at the lower end to an imaginary piston rod in order to prevent piston movement during the application of the chamber pressure. The deformed piston 15'"* is approximately twice as long as the undeformed piston 15.

Figure 5D:
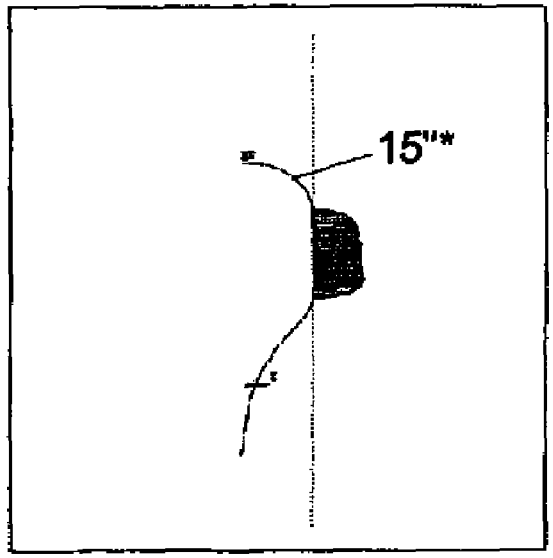
FIG. 5D shows the contact pressure of the piston of FIG. 5C on the wall of the cylinder.

FIG. 5D shows the contact pressure of the piston 15'"* of FIG. 5C. This is low enough to allow movement (friction force 3.2 kg) and suitable for sealing.

Therefore, when applying a chamber pressure on a piston comprising a pressurized elastically deformable container, it is possible to sealingly move as well, at least at the longitudinal position with the smallest cross-sectional area. The stretching due to the applied chamber force is big and it may be necessary to limit this.

Figure 6C:
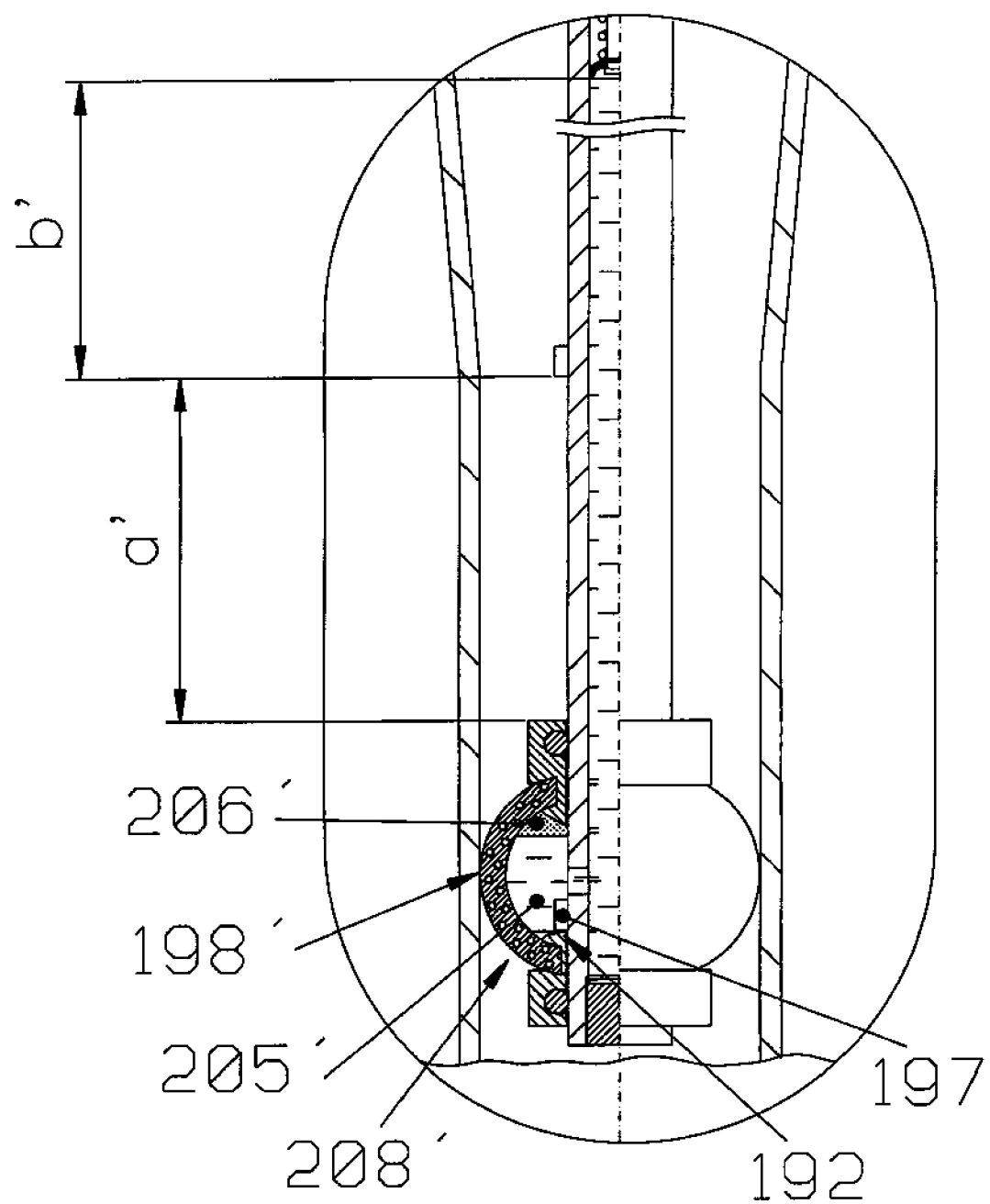
FIG. 6C shows an enlargement of the piston of FIG. 6A at the end of a stroke.
Figures 7A, 7B, 7C:
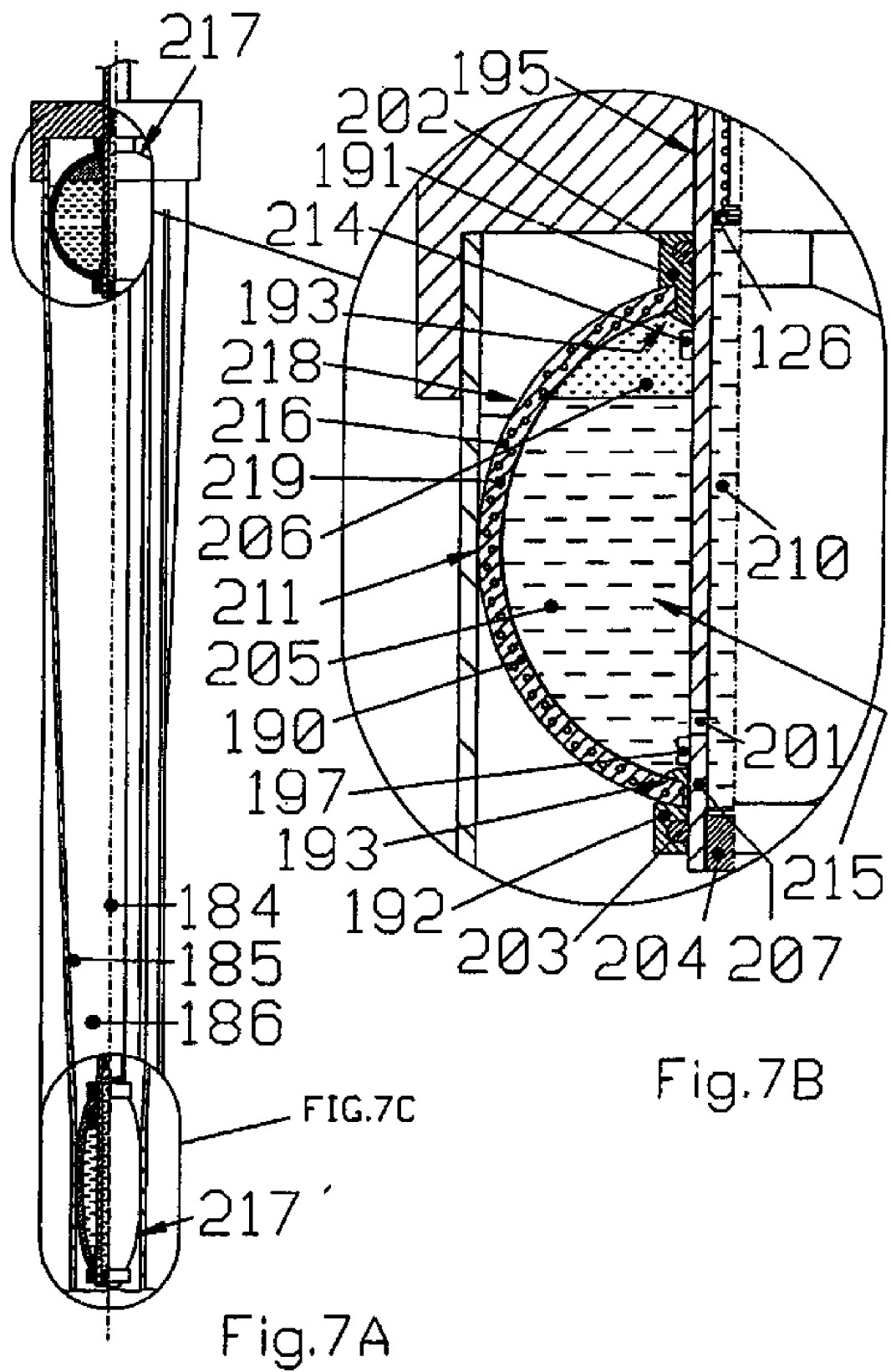
FIG. 7A shows a longitudinal cross-section of a chamber with fixed different areas of the transversal cross-sections and a second embodiment of the piston comprising a fiber reinforcement ('Trellis Effect') with radially-axially changing dimensions of the elastic material of the wall during the stroke—the piston arrangement is shown at the beginning, and at the end of a stroke—pressurized—where it has unpressurized its production size.
FIG. 7B shows an enlargement of the piston of FIG. 7A at the beginning of a stroke.
FIG. 7C shows an enlargement of the piston of FIG. 7A at the end of a stroke.
Figure 7C:
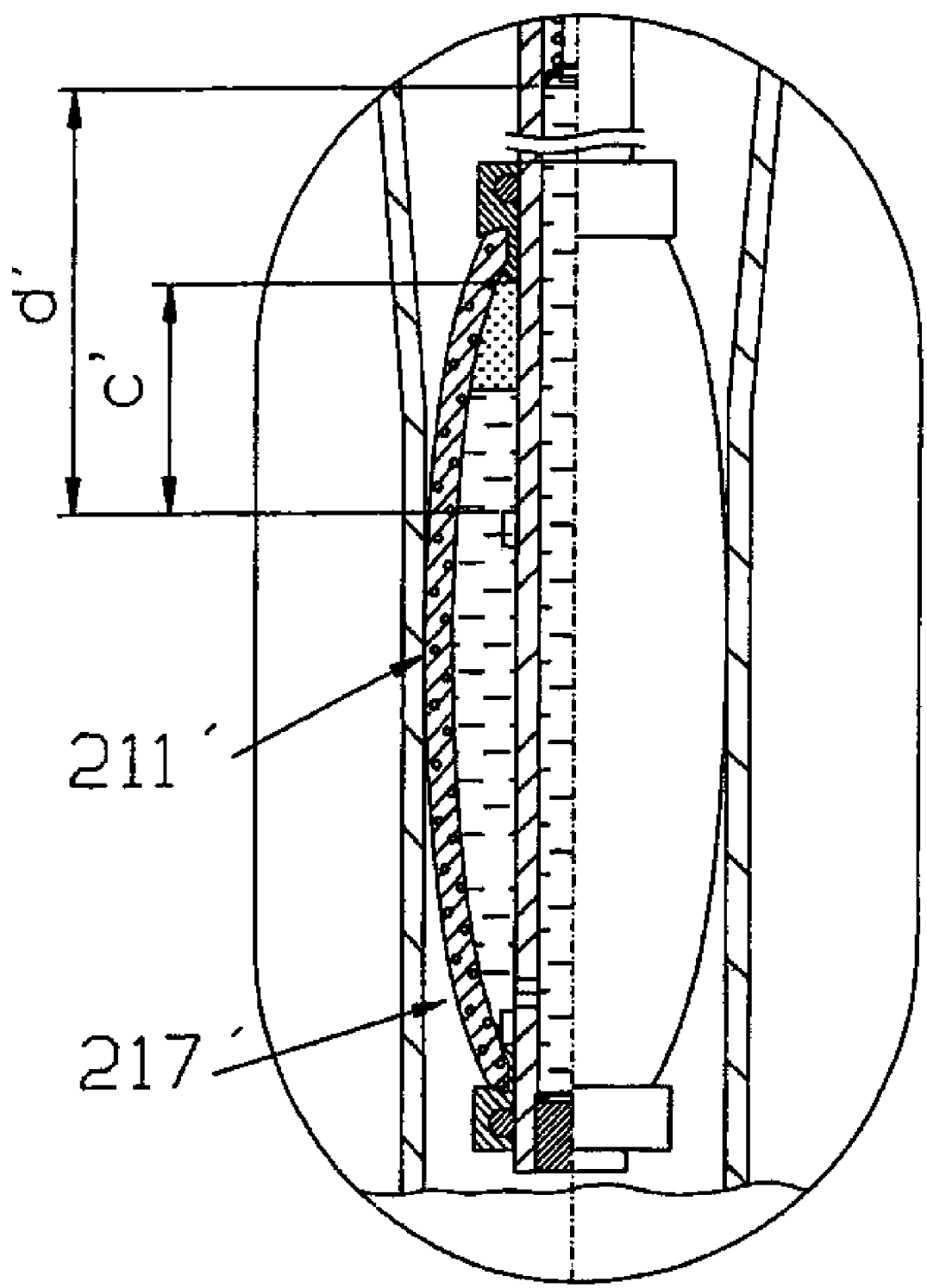

FIGS. 6-8 deal with the limitation of the stretching of the wall of the piston. This comprises a limitation of the stretching in the longitudinal direction when the piston is subjected to a pressure in the chamber, and to allow expansion in the transversal direction, when moving from the second to the first longitudinal position.

The stretching in the longitudinal direction of the wall of the container-type piston may be limited by several methods. It may be done by a reinforcement of the wall of the container by using e.g. textile and/or fiber reinforcement. It may also be done by an inside the chamber of the container positioned expanding body with a limitation for its expansion, while it is connected to the wall of the container. Other methods may be used, e.g. pressure management of a chamber in-between two walls of the container, pressure management of the space above the container etc.

The expansion behaviour of the wall of the container may be depending on the type of the stretching limitation used. Moreover, the keeping of the piston which is moving over the piston rod, while expanding, may be guided by a mechanical stop. The positioning of such a stop may be depending on the use of the piston-chamber combination. This may also be the case for the guidance of the container over the piston rod, while expanding and/or sujected to external forces.

All kinds of fluids may be used—a combination of a compressable and a non-compressable medium, a compressable medium only or a non-compressable medium only.

As the change of the size of the container may be substantial from the smallest cross-sectional area, where it has its production size, and expanded at the biggest cross-sectional area, a communication of the chamber in the container with a first enclosed space, e.g. in the piston rod may be necessary. In order to keep the pressure in the chamber, the first enclosed space may be pressurized as well, also during the change of the volume of the chamber of the container. Pressure management for at least the first enclosed space may be needed.

FIG. 6A shows a longitudinal cross-section of the chamber 186 with a concave wall 185 and an inflatable piston comprising a container 208 at the beginning (=first longitudinal position in the chamber 186) and the same 208' at the end of a stroke (=second longitudinal position in the chamber 186). Central axis of the chamber 186 is 184. The container 208' shows its production size, having a textile reinforced 189 in the skin 188 of the wall 187. During the stroke, the wall 187 of the container expands until a stop arrangement, which may be the textile reinforcement 189 and/or a mechanical stop 196 outside the container 208 and/or another stop arrangement stops the movement during the stroke. And thus the expansion of the container 208. Depending on the pressure in the chamber 186, there still may occur a longitudinal stretching of the wall of the container, due to pressure in the chamber 186. The main function however of the reinforcement is to limit this longitudinal stretching of the wall 187 of the container 208. During the stroke the pressure inside the container 208,208' may remain constant. This pressure depends on the change in the volume of the container 208,208', thus on the change in the circumferential length of the cross-sections of the chamber 186 during the stroke. It may also be possible that the pressure changes during the stroke. It may also be possible that the pressure changes during the stroke, depending or not of the pressure in the chamber 186.

FIG. 6B shows a first embodiment of the expanded piston 208 at the beginning of a stroke. The wall 187 of the container is build up by a skin 188 of a flexable material, which may be e.g. a rubber type or the like, with a textile reinforcement 189, which allows expansion. The direction of the textile reinforcement in relation to the central axis 184 (=braid angle) is different from 54°44'. The change of the size of the piston during the stroke results not necessarily in an identical shape, as drawn. Due to the expansion the thickness of the wall of the container may be smaller than that of the container as produced when positioned attend of the stroke (=second longitudinal position). An impervious layer 190 inside the wall 187 may be present. It is tightly squeezed (193) in the cap 191 in the top and the cap 192 in the bottom of the container 208, 208'. Details of said caps are not shown and all kinds of assembling methods may be used—these may be capable to adapt themselves to the changing thickness of the wall of the container. Both caps 191,192 can translate and/or rotate over the piston rod 195. These movements may be done by various methods as e.g. different types of bearings which are not shown. The cap 191 in the top of the container may move upwards and downwards. The stop 196 on the piston rod 195 outside the container 208 limits the upwards movement of the container 208. The cap 192 in the bottom may only move downwards because the stop 197 prevent a movement upwards—this embodiment may be thought to be used in a piston chamber device which has pressure in chamber 186 beneath the piston. Other arrangements of stops may be possible in other pump types, such as double working pumps, vacuum pumps etc. and depends solely of the design specifications. Other arrangements for enabling and/or limiting the relative movement of the piston to the piston rod may occur. The tuning of the sealing force may comprise a combination of an incompressable fluid 205 and a compressable fluid 206 (both alone are also a possibility) inside the container, while the chamber 209 of the container may communicate with a second enclosed space 210 comprising a spring-force operated piston 126 inside the piston rod 195. The fluid(s) may freely flow through the wall 207 of the piston rod through the hole 201. It may be possible that the second enclosed space is communicating with a third chamber (see FIG. 11A, while the pressure inside the container also may be depending on the pressure in the chamber 186. The container may be inflatable through the piston rod 195 and/or by communicating with the chamber 186. O-rings or the like 202, 203 in said cap in the top and in said cap in the bottom, respectively seal the caps 191,192 to the piston rod. The cap 204, shown as a screwed assembly at the end of the piston rod 195 thighthens said piston rod. Comparable stops may be positioned elsewhere on the piston rod, depending on the demanded movement of the wall of the container. The contact area between the wall of the container and the wall of the chamber is 198.

FIG. 6C shows the piston of FIG. 6B at the end of a pump stroke, where it has its production size. The cap 191 in the top is moved over a distance a'°from the stop 196. The springforce operated valve piston 126 has been moved over a distance b'. The bottom cap 192 is shown adjacent to the stop 197—when there is pressure in the chamber 186, then the bottom cap 192 is pressed against the stop 197. The compressable fluid 206'°and the non-compressable fluid 205'. The contact area 198'°between the container 208'°and the wall of the chamber at the second longitudinal position.

FIG. 7A shows a longitudinal cross-section of the chamber 186 with a concave wall 185 and an inflatable piston comprising a container 217 at the first longitudinal position of the chamber and the same 217'°at the second longitudinal position. The container 217'°shows its production size, having a fiber reinforced 219 in the skin 216 of the wall 218 according to the 'Trellis Effect'. During the stroke, the wail 218 of the container expands until a stop arrangement, which may be the fiber reinforcement 219 and/or a mechanical stop 214 inside the container and/or another stop arrangement stops the movement during the stroke. And thus stops the expansion of the wall 218 of the container 217. The main function of the fiber reinforcement is to limit the longitudinal stretching of the wall 218 of the container 217. During the stroke the pressure inside the container 217,217'°may remain constant. This pressure depends on the change in the volume of the container 217,217', thus on the change in the circumferential length of the cross-sections of the chamber 186 during the stroke. It may also be possible that the pressure changes during the stroke, depending or not of the pressure in the chamber 186. The contact area 211 between the container 217 and the wall of the chamber at the first longitudinal position. The Trellis Effect is where a decrease of the transverse sectional area of the chamber causes a decrease in the size of the inflatable body(—chamber) in that direction and a three dimensional reduction is possible due to the fiber architecture, where fibres are shearing layer wise independently from each other. See U.S. Pat. No. 6,978,711.

FIG. 7B shows a second embodiment of the expanded piston 217 at the beginning of a stroke. The wall 218 of the container is build up by a skin 216 of a flexible material, which may be e.g. a rubber type or the like, with a fiber reinforcement 219, which allows expansion of the container wall 218, and thus the direction of the fibers in relation to the central axis 184 (=braid angle) may be different from 54°44'. Due to the expansion the thickness of the wall of the container may be smaller, but not necessarily very different than that of the container as produced when positioned at the end of the stroke (=second longitudinal position). An impervious layer 190 inside the wall 218 may be present. It is tightly squeezed in the cap 191 in the top and the cap 192 in the bottom of the container 217,217'. Details of said caps are not shown and all kinds of assembling methods may be used—these may be capable to adapt themselves to the changing thickness of the wall of the container. Both caps 191,192 can translate and/or rotate over the piston rod 195. These movements may be done by various methods as e.g. different types of bearings which are not shown. The cap 191 in the top can move upwards and downwards until stop 214 limits this movement. The cap 192 in the bottom can only move downwards because the stop 197 prevent a movement upwards—this embodiment is thought to be used in a piston chamber device which has pressure in chamber 186. Other arrangements of stops may be possible in other pump types, such as double working pumps, vacuum pumps etc. and depends solely of the design specifications. Other arrangements for enabling and/or limiting the relative movement of the piston to the piston rod may occur. The tuning of the sealing force may comprise a combination of an incompressable fluid 205 and a compressable fluid 206 (both alone are also a possibility) inside the container, while the chamber 215 of the container 217,217'may communicate with a second enclosed space 210 comprising a spring-force operated piston 126 inside the piston rod 195. The fluid(s) may freely flow through the wall 207 of the piston rod through the hole 201. It may be possible that the second enclosed space 210 is communicating with a third chamber (see FIG. 10), while the pressure inside the container also may be depending on the pressure in the chamber 186. The container may be inflatable through the piston rod 195 and/or by communicating with the chamber 186. O-rings or the like 202, 203 in said cap in the top and in said cap in the bottom, respectively seal the caps 191,192 to the piston rod. The cap 204, shown as a screwed assembly at the end of the piston rod 195 thighthens said piston rod.

FIG. 7C shows the piston of FIG. 7B at the end of a pump stroke, where it has its production size. The cap 191 is moved over a distance c' from the stop 216. The spring-force operated valve piston 126 has been moved over a distance d'. The bottom cap 192 is shown adjacent to the stop 197—if there is pressure in the chamber 186, than the 192 is pressed against the stop 197. The compressable fluid 206' and the non-compressable fluid 205'.

FIGS. 8A,B,C show an inflatable piston comprising a container 228 at the beginning and 228' at the end of a stroke. The production size is that of piston 228' at the second longitudinal position in the chamber 186. The construction of the piston may be identical with that of FIGS. 7A,B,C with the exception that the reinforcement comprises of any kind of reinforcement means which may be bendable, and which may ly in a pattern of reinforcement 'colums' which do not cross each other. This pattern may be one of parallel to the central axis 184 of the chamber 186 or one of where a part of the reinforcement means may be in a plane through the central axis 184.

FIG. 8B shows the wall 221 with the skin 222 and 224. The reinforcement means 227. The contact area 225 between the container 228 and the wall of the chamber at the first longitudinal position.

Figure 8C:
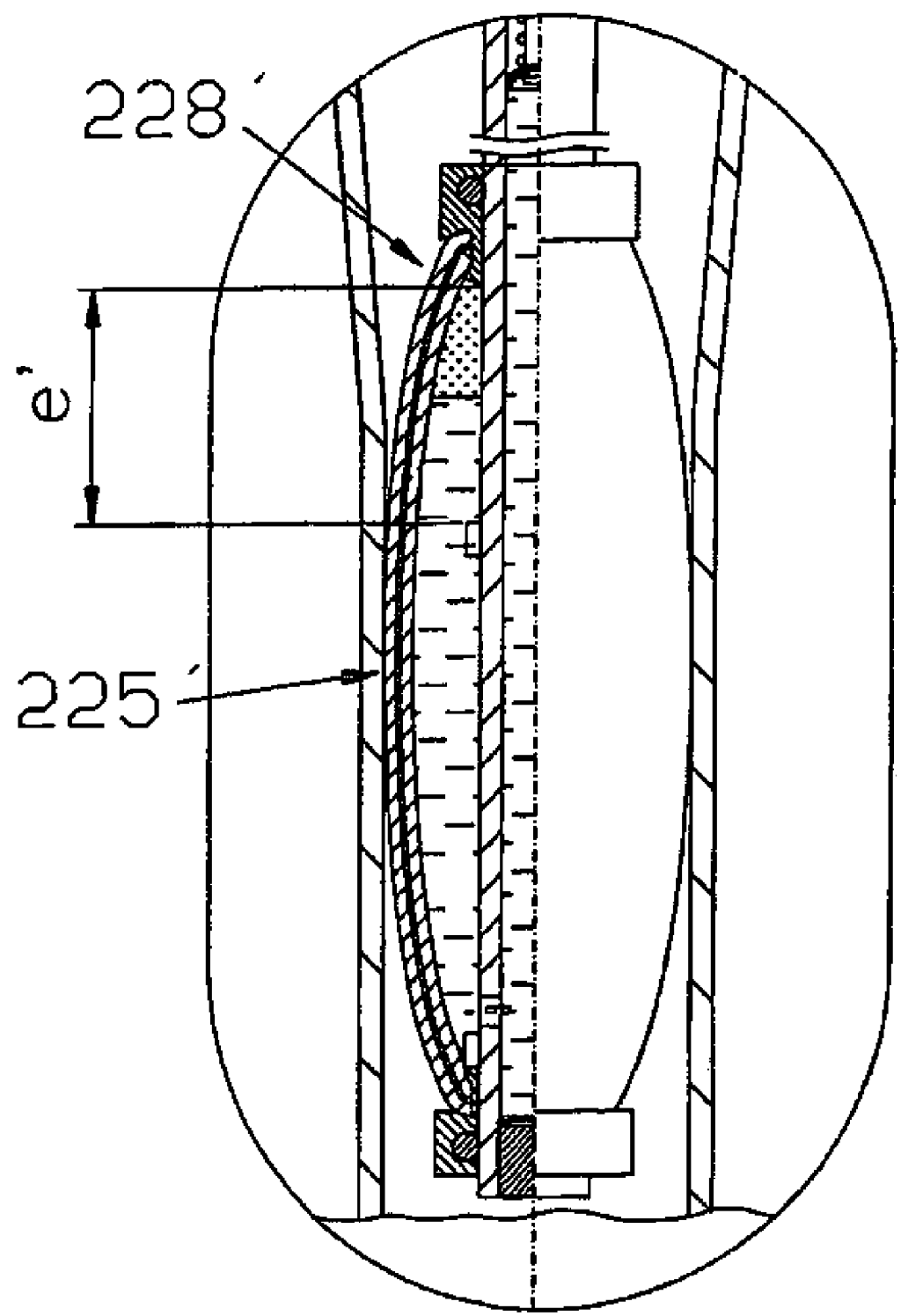
FIG. 8C shows an enlargement of the piston of FIG. 8A at the end of a stroke.

FIG. 8C shows the contact area 225'between the container 228'°and the wall of the chamber at the second longitudinal position.

Figure 8D:
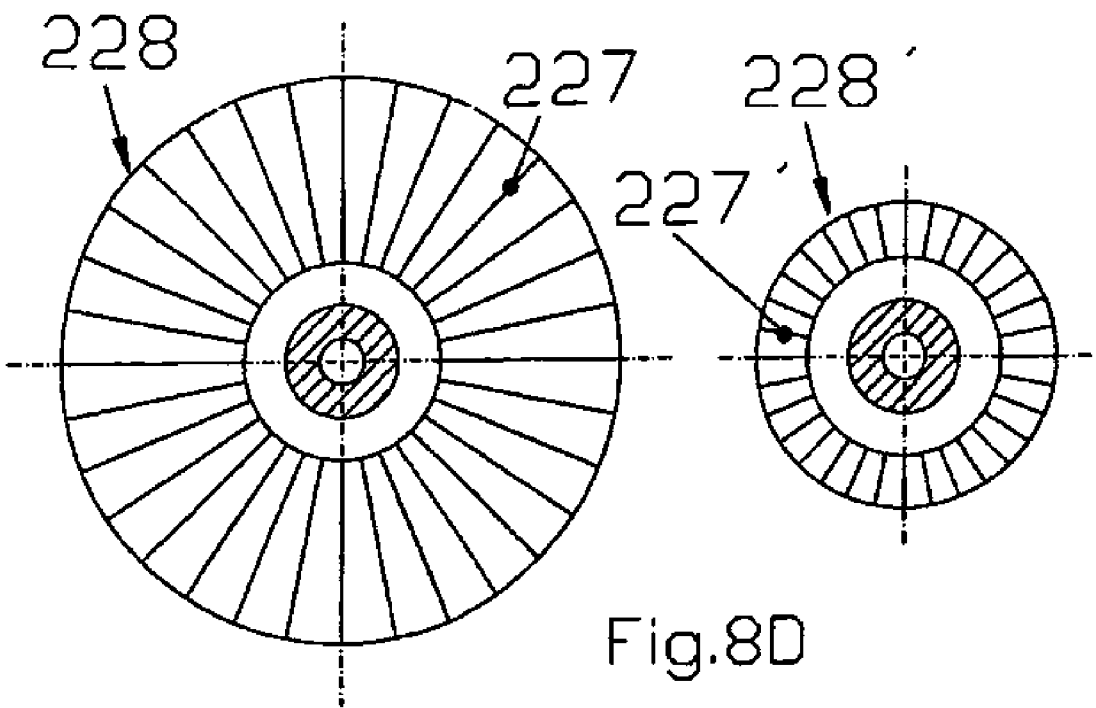
FIG. 8D shows a top view of the piston of FIG. 8A with a reinforcement in the wall in planes through the central axis of the piston—left: at the first longitudinal position, right: at the second longitudinal position.

FIG. 8D shows a top view of the piston 228 and 228', respectively with the reinforcement means 227, and 227'°respectively.

Figure 8E:
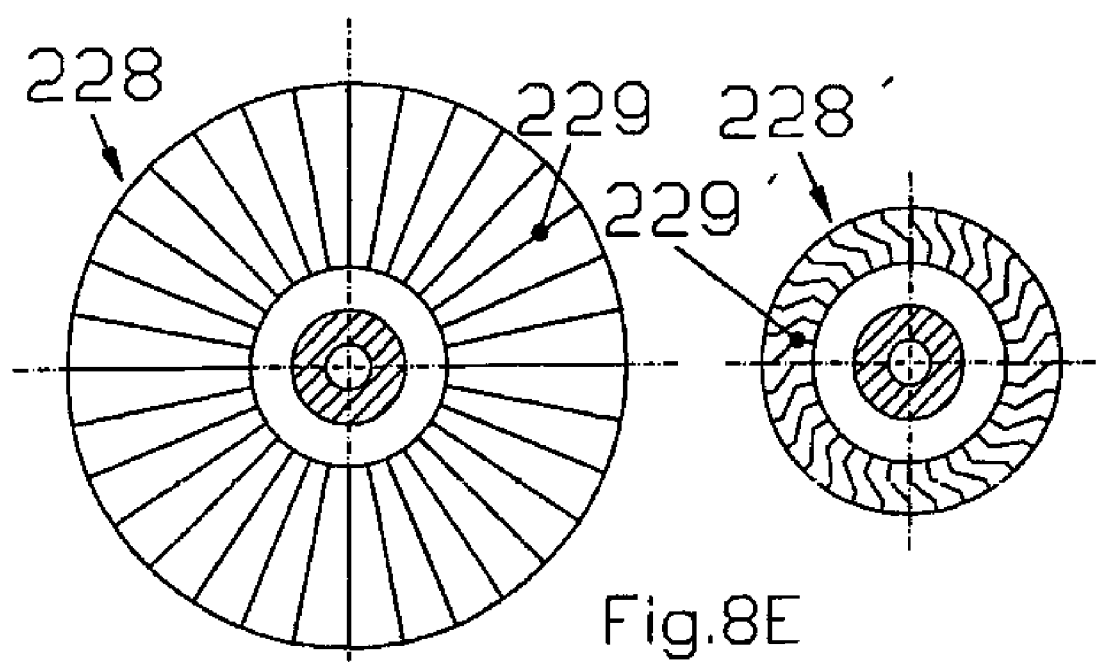
FIG. 8E shows a top view of the piston of FIG. 8A having reinforcements in the skin in planes partly through the central axis and partly outside the central axis—left: at the first longitudinal position, right: at the second longitudinal position.

FIG. 8E shows a top view of the piston 228 and 228', respectively with the reinforcement means 229, and 229' respectively.

FIG. 9A shows a longitudinal cross-section of the chamber with a convex/concave wall 185 and an inflatable piston comprising a container 258 at the beginning and the same 258'°at the end of a stroke. The container 258' shows its production size.

FIG. 9B shows the longitudinal cross-section of the piston 258 having a reinforced skin by a plurality of at least elastically deformable support members 254 rotatably fastened to a common member 255, connected to the an skin 252 of said piston 258,258'. These members are in tension, and depending on the hardness of the material, they have a certain maximum stretching length. This limited length limits the stretching of the skin 252 of said piston. The common member 255 may slide with sliding means 256 over the piston rod 195. For the rest is the construction comparable with that of the piston 208,208'. The contact area is 253.

Figure 9C:
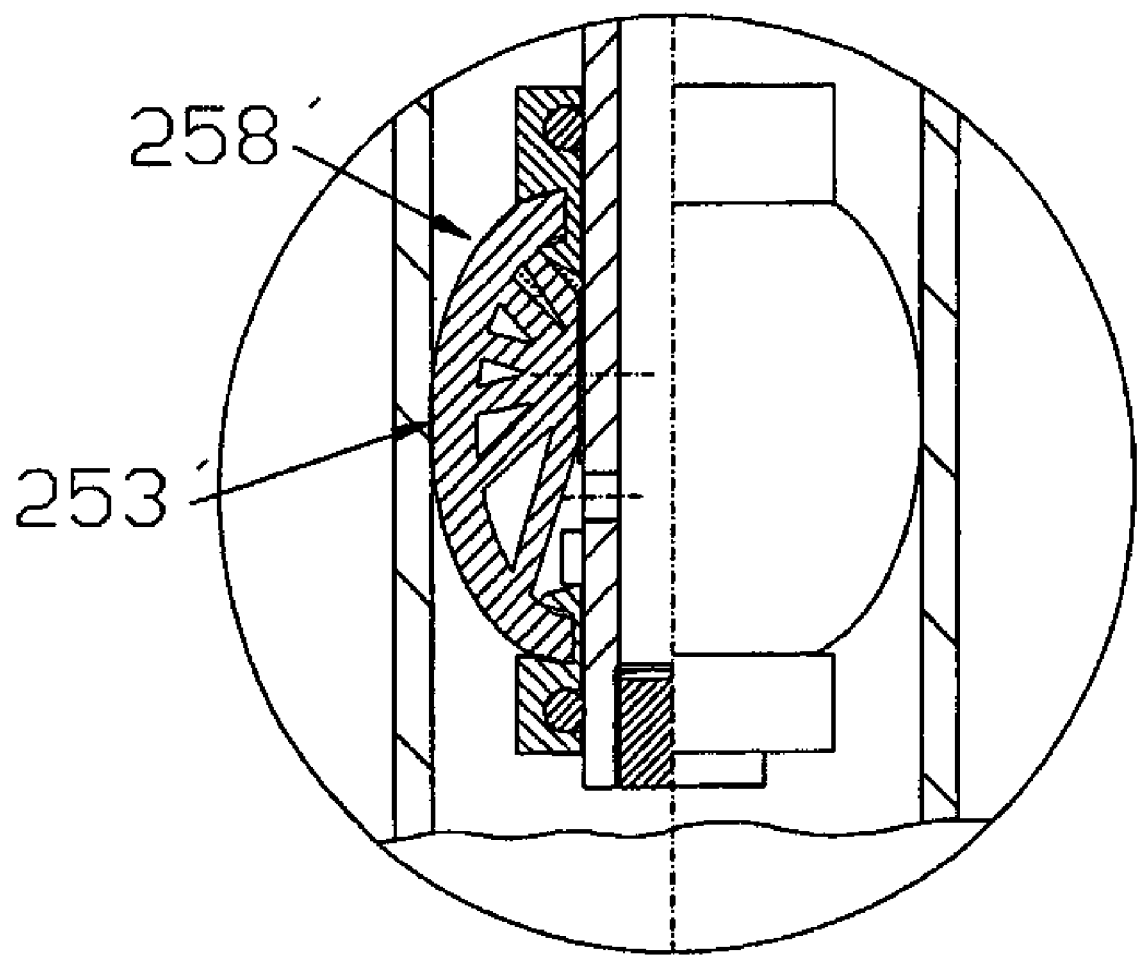
FIG. 9C shows an enlargement of the piston of FIG. 9A at the end of a stroke.

FIG. 9C shows the longitudinal cross-section of the piston 258'. The contact area is 253'.

Figure 11D:
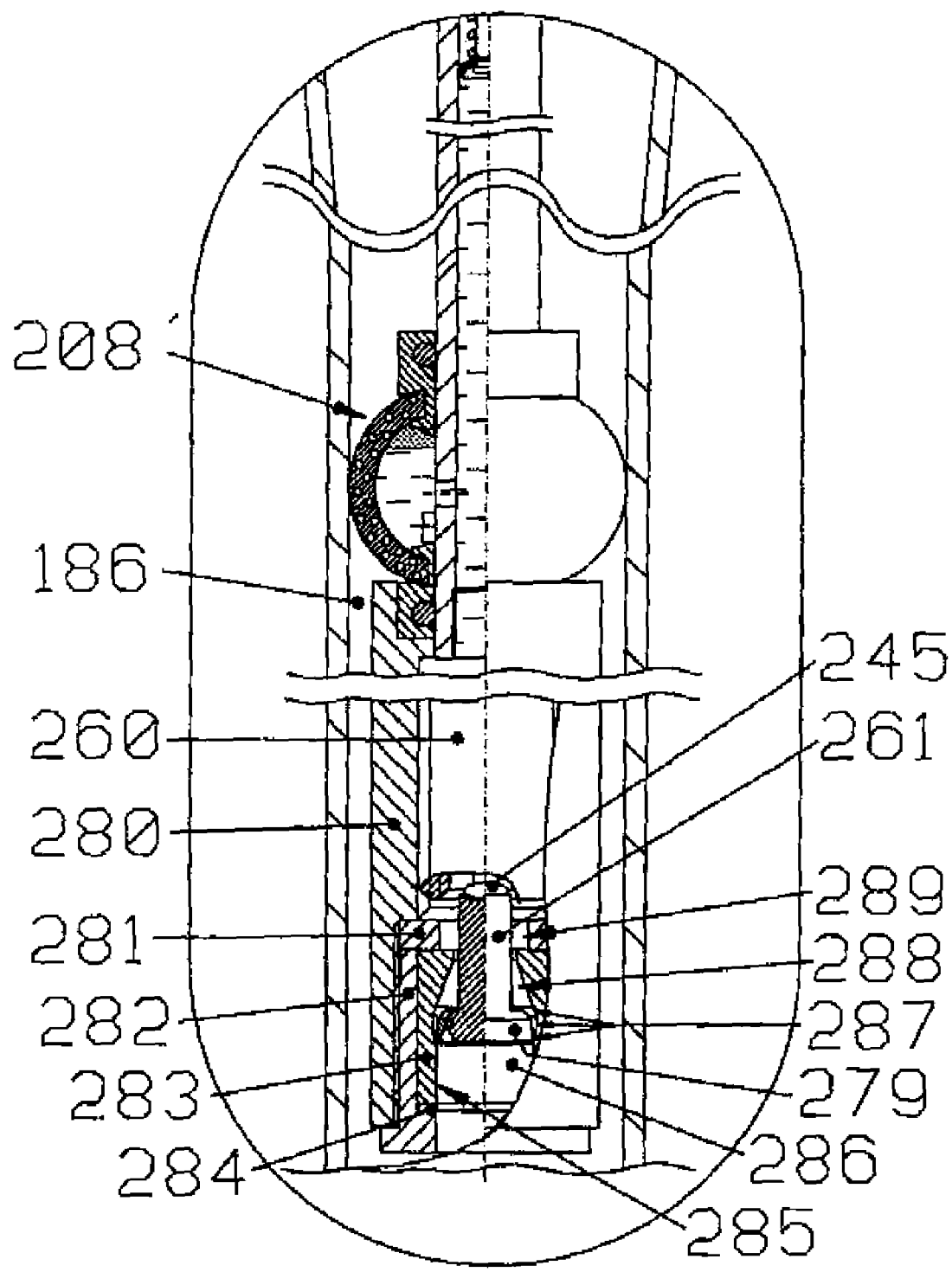
FIG. 11D shows an enlargement of the inflation arrangement of the piston of FIG. 11A at the end of the stroke.
Figure 11E:
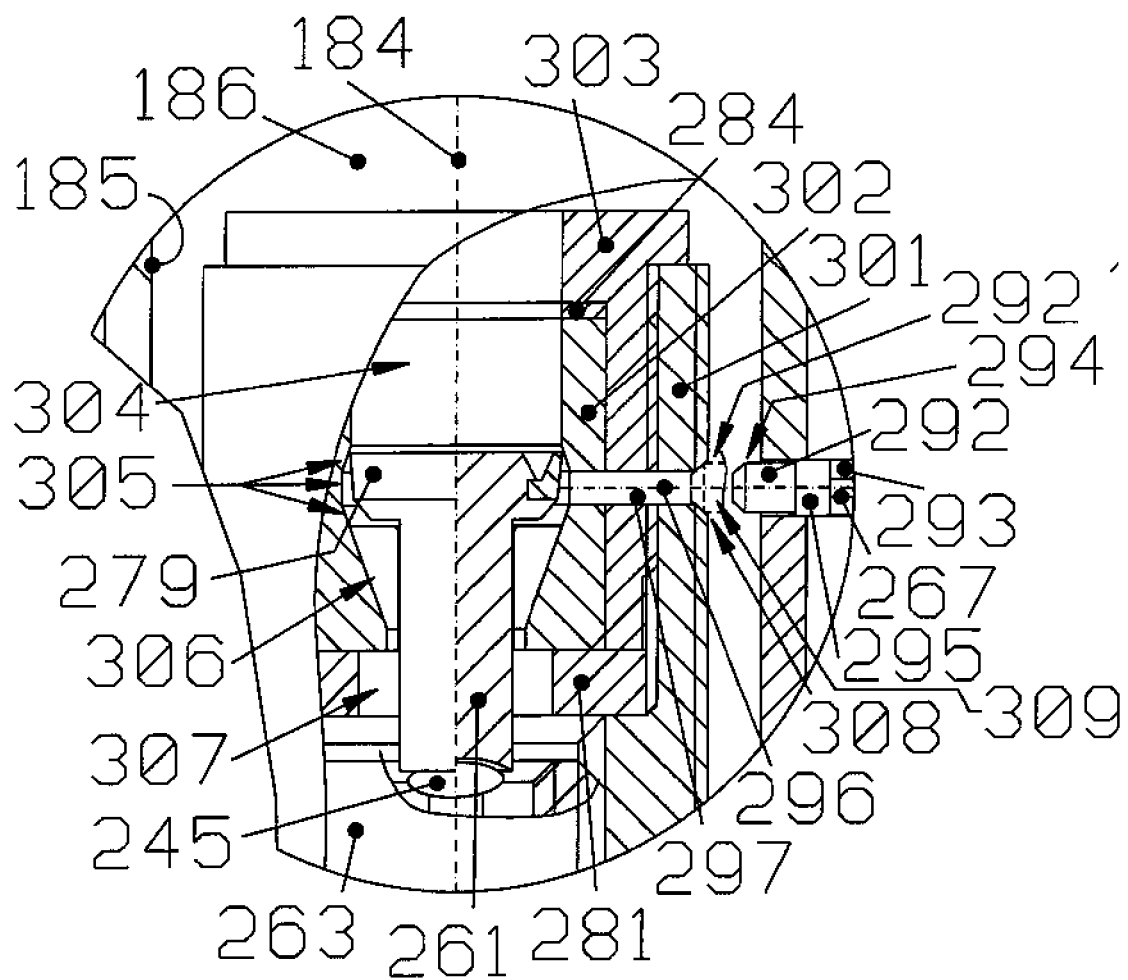
FIG. 11E shows an enlargment of the bypass arrangement for the valve actuator for closing and opening of the outlet valve.
Figure 11F:
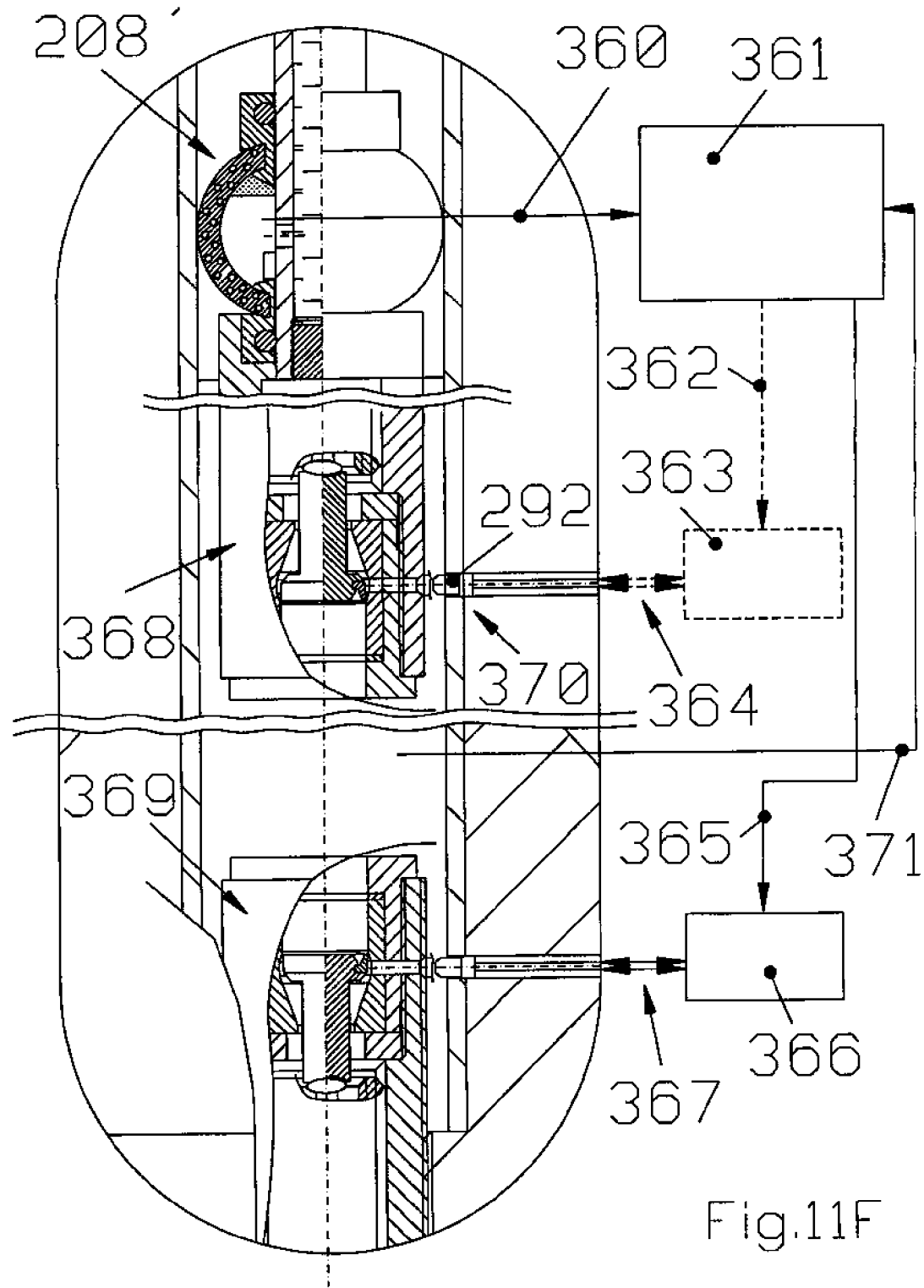
FIG. 11F shows an enlargement of an automatic closing and opening arrangement of the outlet valve—a comparable system is shown for optaining a predetermined pressure value in the piston (dashed).
Figure 11G:
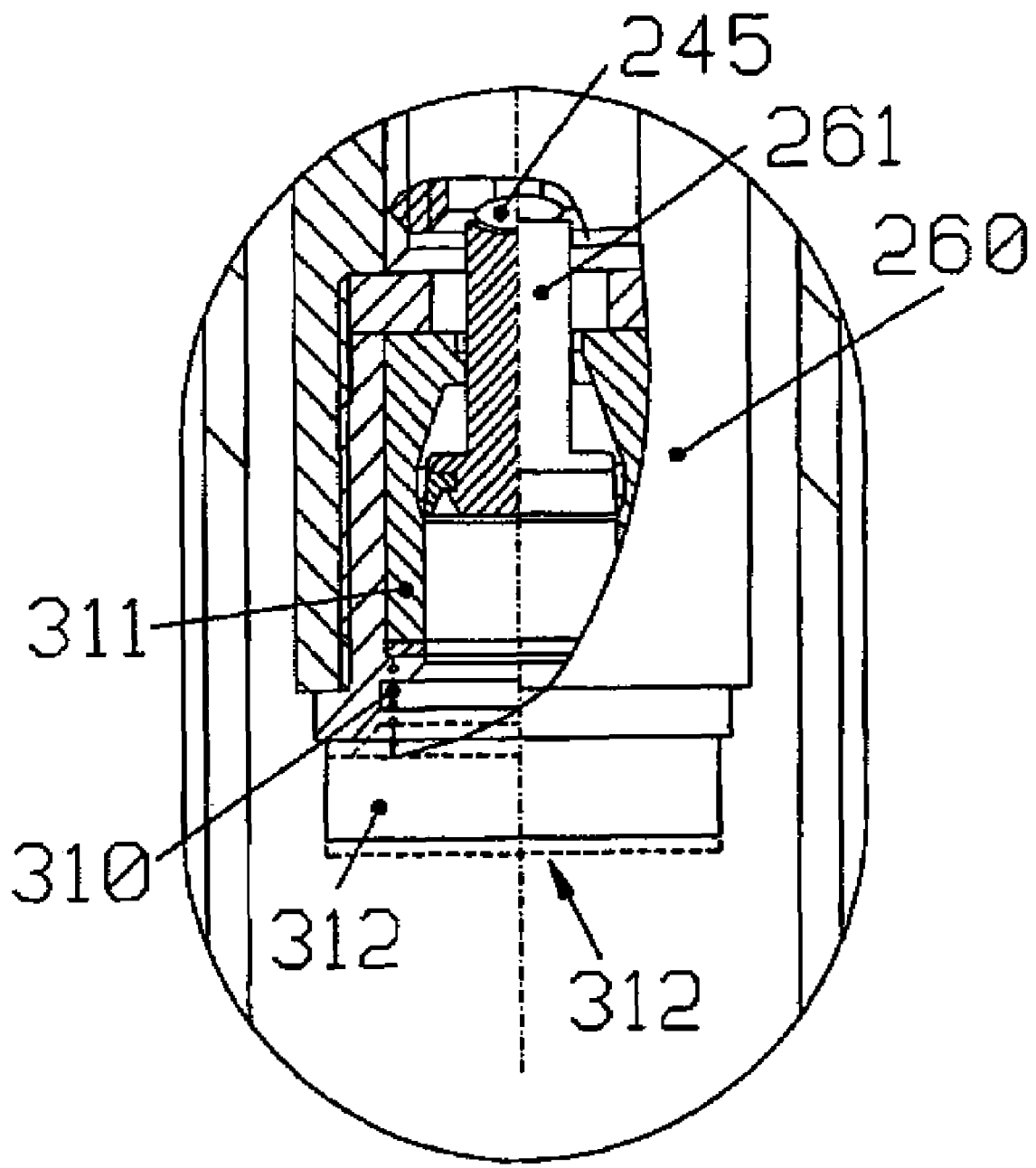
FIG. 11G shows an enlargement of an inflation arrangement of the piston of FIG. 11A, comprising a combination of a valve actuator and a spring force operated cap, which makes it possible to automatically inflate the piston from the chamber to a certain predetermined pressure.
Figure 12:
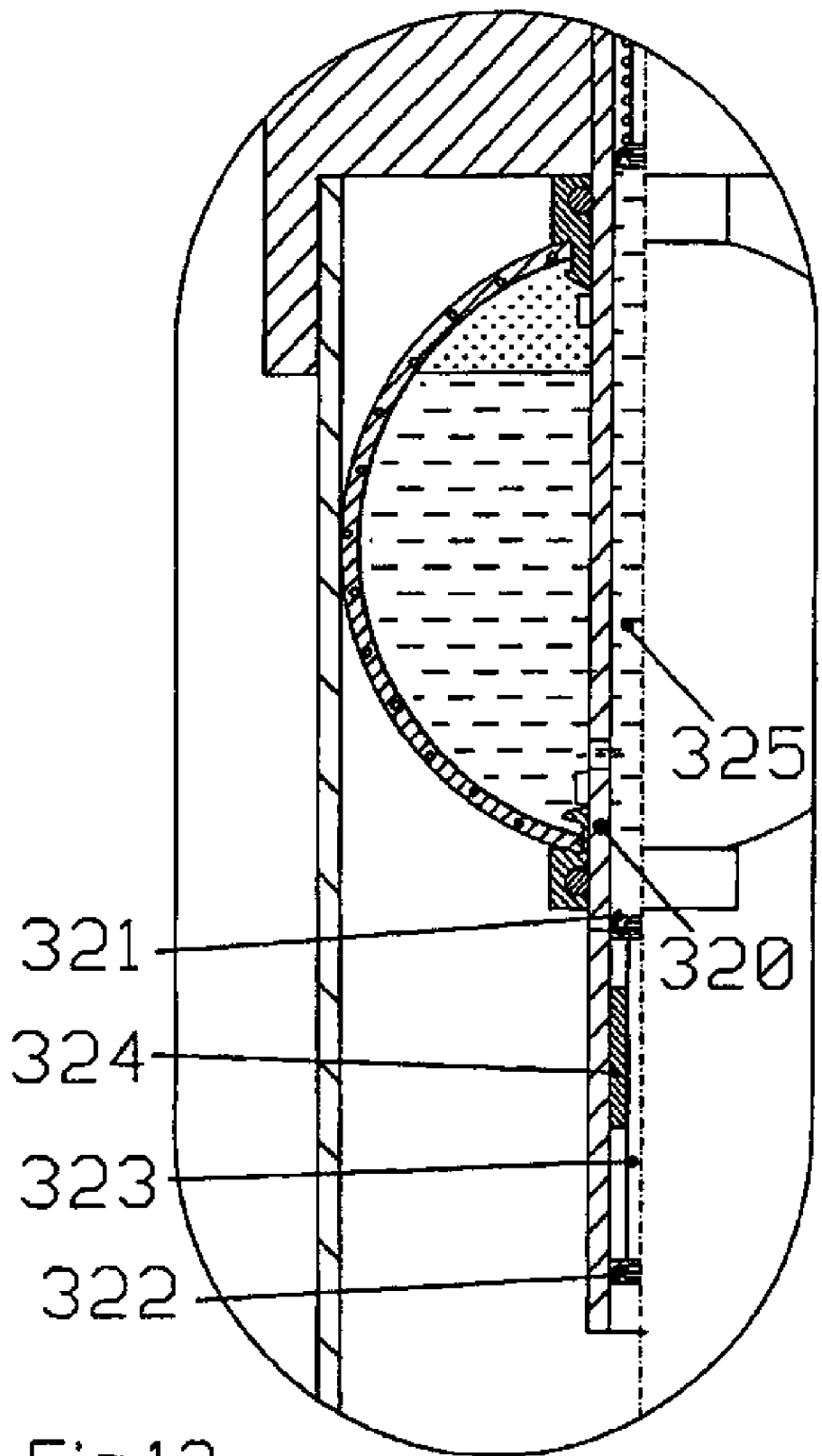
FIG. 12 shows an arrangement where the pressure in the container may depend of the pressure in the chamber.

FIGS. 10-12 deal with the management of the pressure within the container. Pressure management for the piston comprising an inflatable container with an elastically deformable wall is an important part of the piston-chamber construction. Pressure management has to do with maintaining the pressure in the container, in order to keep the sealing on the appropriate level. This means during each stroke where the volume of the container changes. And in the long term, when leakage from the container may reduce the pressure in the container, which may effect the sealing capability. A flow of fluid may be the solution. To and from the container when it changes volume during a stroke, and/or to the container as such (inflation).

The change in the volume of the container may be balanced with a change in the volume of a first enclosed space, communicating with the container through e.g. a hole in the piston rod. The pressure may also be balanced, and this may be done by a spring force operated piston which may be positioned in the first enclosed space. The spring force may be originated by a spring or a pressurized enclosed space, e.g. a second enclosed space, which communicates with the first enclosed space by a pair of pistons. Any kind of force transfer may be arranged by each of the pistons, e.g. by a combination of the second enclosed space and a piston herein, so that the force on the piston in the first enclosed space remains equal, while the force on the piston in the second enclosed space reduces, when the pair of pistons moves more into the first enclosed space e.g. when fluid is moving from the first enclosed space into the container. This complies well with p.V=constant in the second enclosed space. The tuning of the pressure in the chamber of the container during the entire or a part of the stroke may also be done by a communication of the chamber and the chamber of the container. This has already been described in WO00/65235 and WO00/70227.

The container may be inflated through a valve in the piston and/or the handle. This valve may be a check valve or an inflation valve, e.g. a Schrader valve. The container may be inflated through a valve which communicates with the chamber. If an inflation valve is used, a Schrader valve is preferable because of its security to avoid leakages and its ability to allow to control all kinds of fluids. In order to enable inflation, a valve actuator may be necessary, e.g. the one disclosed in WO99/26002. This valve actuator has the advantage that inflation may be enabled by a very low force—thus very practical in case of manual inflation.

Having a valve communicating with the chamber, it may enable automatic inflation of the container, when the pressure in the container is lower than the pressure in the chamber. When this may not be the case, such higher pressure in the chamber may be created temporarily by closing the outlet valve of the chamber near the second longitudinal position of the container in the chamber. This closing and opening may be done manually, e.g. by a pedal, which opens a channel which communicates with a space between the valve actuator (WO99/26002) and e.g. a Schrader valve. When open, the valve actuator may move, but lacks the force to depress the core pin of the valve and hence the Schrader valve may not open—thus the chamber may be closed, and any high pressure may be build up for enabling inflation of the container. When the channel is closed, the actuator functions as disclosed in WO99/26002. The operator may check the pressure in the container by a manometer. Opening and closing of this outlet valve may also be done automatically. This may be done by all kinds of means, which initiate the closing of the outlet by a signal of any kind as a result of a measurement of pressure being lower than a predetermined value.

The automatic inflation of the container to a certain predetermined value may be done by a combination of a valve communicating with the chamber and e.g. a release valve in the container. It releases at a certain predetermined value of the pressure, e.g. to the space above the container or to the chamber. Another option may be that the valve actuator of WO99/26002 may be open firstly after a pre-determined value of the pressure has been reached, e.g. by combining it with a spring. Another option may be that the opening to the valve actuator is closed when the pressure reaches a value over the pre-determined one, by e.g. a spring force operated piston.

FIG. 10A shows a piston-chamber system with a piston comprising a container 208,208' and a chamber 188 having a central axis 184 according to FIG. 6A-C. The inflation and pressure management described here may also be used for other pistons comprising a container. The container 208,208' may be inflated through a valve 241 in the handle 240 and/or a valve 242 in the piston rod 195. If no handle is used, but e.g. a rotating axle, it could be hollow, communicating with e.g. a Schrader valve. The valve 241 may be an inflation valve, e.g. a Schrader valve, comprising a bushing 244 and a valve core 245. The valve in the piston rod 195 may be a check valve, having a flexible piston 126. The chamber between the check valve 242 and the chamber 209 of the container 208,208'°was earlier described as the 'second' enclosed space 210. The manometer 250 enables control of the pressure inside the container—no further details are shown. It may also be possible to use this manometer to control the pressure in the chamber 186. It may also be possible that the chamber 209 of the container 208,208' has a release-valve (not drawn) which may be adjusted to a certain pre-determined value of the pressure. The released fluid may be released to the chamber 209 and/or to the space 251.

FIG. 10B shows an alternative option for the inflation valve 241. Instead of the inflation valve 241 in the handle 240, only a bushing 244 without a valve core 245 may be present, which enables connection to a pressure source.

FIG. 10C shows details of the bearing 246 of the rod 247 of the piston 126 which may act as a check valve. The bearing 246 comprises longitudinal ducts 249 enabling passage of fluid around the rod 247. The spring 380 enables a pressure on the fluid in the second enclosed space 210. The stop 239.

FIG. 10D shows details of the flexible piston 126, which may function as check valve 242. The spring 380 keeps the pressure on the piston 126.

FIG. 11A shows a piston-chamber system with a piston comprising a container 208,208' and a chamber 186 having a central axis 184 according to FIG. 6A-C. The inflation and pressure management described here may also be used for other pistons comprising a container. The container 248,248' may be inflated through a valve communicating with the chamber 186. This valve 242 may be a piston 126 according to FIG. 10A,D or it may be an inflation valve, preferably a Schrader valve 260. The second closed space 210 is communicating with the chamber 209 in the container by a hole 201, while the second enclosed space 210 is communicating through a piston arrangement with a second enclosed space 243, which may be inflated through e.g. an inflation valve like a Schrader valve 241 which may positioned in the handle 240. The valve has a core pin 245. If no handle is used, but e.g. a rotating axle, it may be hollow and a Schrader valve may communicate with this channel (not drawn). The Schrader valve 260 has a valve actuator 261 according to WO99/26002. The foot 262 of the chamber 186 may have an outlet valve 263, e.g. a Schrader valve, which may be equipped with another valve actuator 261 according to WO99/26002. In order to manually control the outlet valve 263, the foot 262 may be equipped with a pedal 265 which can turn an angle a around an axle 264 on the foot 262. The pedal 265 is connected to a piston rod 267 by an axle 266 in a non-circular hole 275 in the top of the pedal 265. The foot 262 has an inlet valve 269 (not drawn) for the chamber 186. The (schematically drawn) spring 276 keeps the pedal 265 in its initial position 277, where the outlet valve is kept open. The activated position 277' of the pedal 265 when the outlet valve is kept dosed. The outlet channel 268.

FIG. 11B shows a detail of the communication by a pair of pistons 126 (from FIG. 10D) and 270 between the second endosed space 210 and the third enclosed space 243. The piston rod 271 of the pair of pistons is guided by a bearing 246. The longitudinal ducts 249 in the bearing 246 enable the transport of fluid from the spaces between the bearing 246 and the pistons 126 and 270. The spring 380 may be present. The piston rod of the piston type container 248,248' is 195, with the wall 194.

FIG. 11C shows an alternative wall 273 of the piston rod 272 of the piston type container 248,248' which has a angle β° with the central axis 184 of the chamber 186. The piston 274 is schematically drawn, and can adapt itself to the changing cross-sectional area's of the inside the piston rod 272.

FIG. 11D shows piston 248' on which a housing 280 is build. The housing comprises a Schrader valve 260, with a core pin 245. The valve actuator 261 shown as depressing the core pin 245, while fluid may enter the valve 260 through channels 286, 287,288 and 289. When the core pin 245 is not depressed, the piston ring 279 may seal the wall 285 of the inner cylinder 283. The inner cylinder 283 may be sealingly enclosed by sealings 281 and 284 between the housing 280 and the cylinder 282. The chamber is 186.

FIG. 11E shows the construction of the outlet valve 263 with a core pin 245, which is shown depressed by the valve actuator 261. Fluid may flow through channels 304, 305, 306 and 307 to the openened valve. The inner cylinder 302 is sealingly enclosed between the housing 301 and the cylinder 303 by sealings 281 and 284. A channel 297 having a central axis 296 is positioned through the wall of the inner cylinder 302, the wall of the cylinder 303 and the wall of the housing 301. At the outside of the housing 301 has the opening 308 of channel 297 a widening 309 which enables a piston 292 to seal in a closing position 292' by a top 294. The piston 292 may be moving in another channel 295 which may have the same central axis 296 as channel 297. The bearing 293 for the piston rod 267 of the piston 292. The piston rod 267 may be connected to the pedal 265 (FIG. 11A) or to other actuators (schematically shown in FIG. 11E).

FIG. 11F shows the piston 248' and the inflation arrangement 368 of FIG. 11D, besides the arrangement 369 to control the outlet valve of FIG. 11E. The inflation arrangement 368 comprises now also the arrangement 370 to control the valve of FIG. 11E. This may be done to enabling the closing of the valve, when the predetermined pressure has been reached, and opening it when the pressure is lower than the predetermined value. A signal 360 is handled in a converter 361 which gives a signal 362 to an actuator 363, which is actuating through actuating means 364 the piston 292.

When the chamber has a lower working pressure than the pre-determined value of the pressure in the piston, the arrangement 369 to control the closing and opening of the outlet valve 263 may be controlled by another actuator 363 through means 367 initiated by a signal 365 from the converter 361. A measurement in the chamber, giving a signal 371 to the converter 361 and/or 366 may automatically detect whether or not the actual pressure of the chamber is lower than the working pressure of the piston. This may be specifically practical when the pressure of the piston is lower than the pre-determined pressure.

FIG. 11G shows schematically a cab 312, 312' with a spring 310 connected to the housing 311 of the valve actuator 261. The spring 310 may determine the maximum value of the pressure to depress the valve core pin 245, of a Schrader valve 260.

FIG. 12 shows en enlonged piston rod 320 in which a pair of pistons 321,322 are positioned at the end of a piston rod 323, which may move in a beating 324. The enclosed space 325.

Figures 13A, 13B, 13C, 13D:
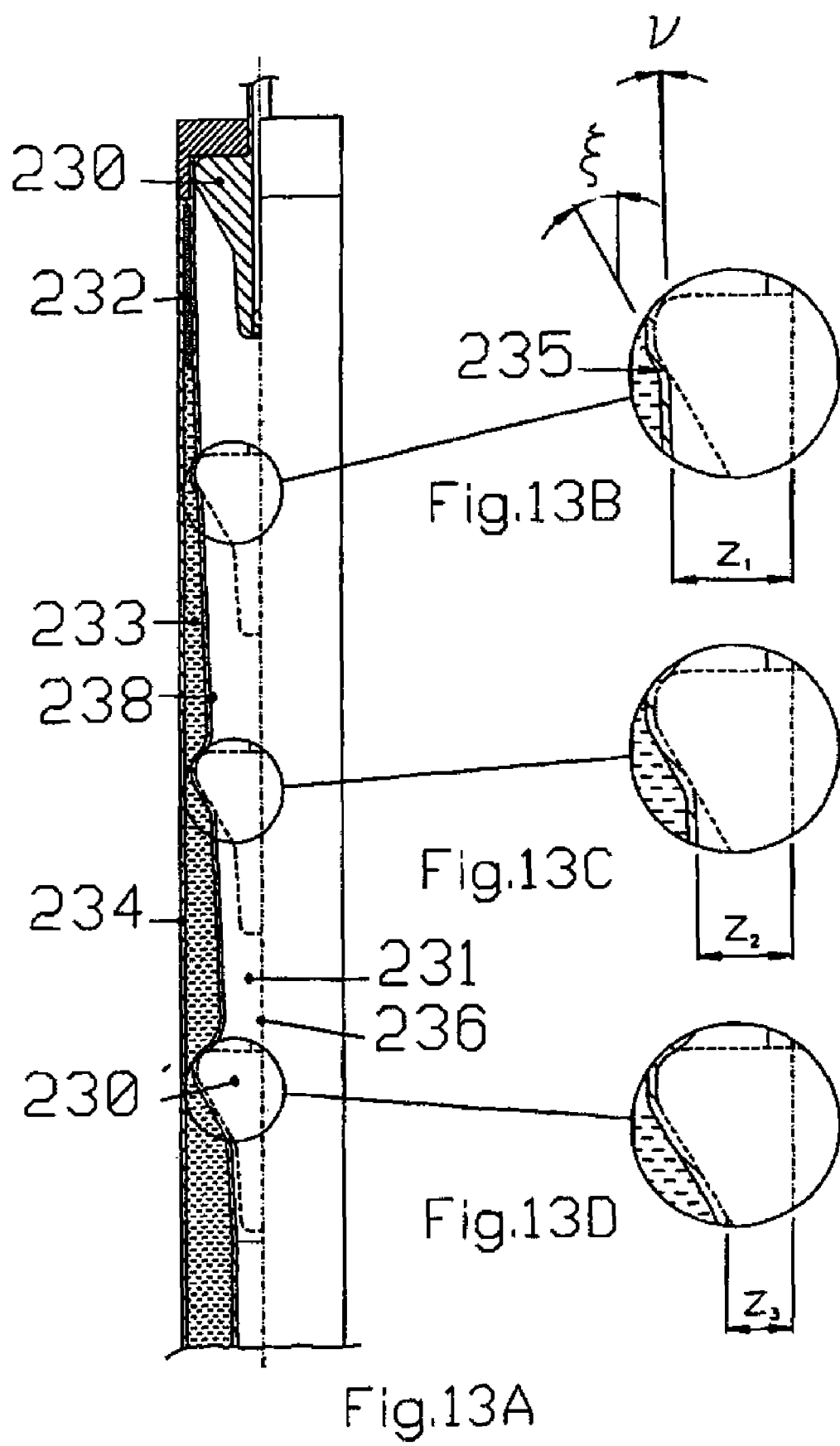
FIG. 13A shows a longitudinal cross-section of a chamber with a flexible wall having different areas of the transversal cross-sections and a piston with fixed geometrical sizes—the arrangement of the combination is shown at the beginning and at the end of the pump stroke.
FIG. 13B shows an enlargement of the arrangement of the combination at the beginning of a pump stroke.
FIG. 13C shows an enlargement of the arrangement of the combination during a pump stroke.
FIG. 13D shows an enlargement of the arrangement of the combination at the end of a pump stroke.

FIGS. 13A,B,C show the combination of a pump with a pressurizing chamber with elastically deformable wall with different areas of the transversal cross sections and a piston with a fixed geometrical shape. Within a housing as e.g. cylinder with fixed geometrical sizes an inflatabel chamber is positioned which is inflatable by a fluid (a non-compressable and/or a compressable fluid). It is also possible that said housing may be avoided. The inflatable wall comprising e.g. a liner-fiber-cover composite or also added an impervious skin. The angle of the sealing surface of the piston is a bit bigger than the comparative angle of the wall of the chamber in relation to an axis parallel to the movement. This difference between said angles and the fact that the momentaneous deformations of the wall by the piston takes place a bit delayed (by having e.g. a viscose non-compressable fluid in the wall of the chamber and/or the right tuning of load regulating means, which may be similar to those which have been shown for the pistons) provides a sealing edge, of which its distance to the central axis of the chamber during the movement between two piston and/or chamber positions may vary. This provides a cross-sectional area change during a stroke, and by that, a designable operation force. The cross-section of the piston in the direction of the movement however may also be equal, or with a negative angle in relation to the angle of the wall of the chamber—in these cases the 'nose' of the piston may be rounded of. In the last mentioned cases it may be more difficult to provide a changing cross-sectional area, and by that, a designable operation force. The wall of the chamber may be equiped with all the already shown loading regulating means the one showed on FIG. 12B, and if necessary with the shape regulating means. The velocity of the piston in the chamber may have an effect on the sealing.

FIG. 13A shows piston 230,230'°at four positions of the piston in a chamber 231 with a central axis 236. Around an inflatable wall 238 a housing 234 with fixed geometrical sizes. Within said housing 234 a compressable fluid 232 and a non-compressable fluid 233. There may be a valve arrangement for inflation of the wall (not shown). The shape of the piston at the non-pressurized side is only an example to show the principle of the sealing edge. The difference in distance between the sealing edge and the central axis 236 at the end and that at the beginning of the stroke in the shown transversal cross-section is approximately 39%. The shape of the longitudinal cross-section may be different from the one shown.

FIG. 13B shows the piston after the beginning of a stroke. The distance from the sealing edge 235 and the central axis 236 is $z_1$. The angle a between the piston sealing edge 235 and the central axis 236 of the chamber. The angle v between the wall of the chamber and the central axis 236. The angle v is shown smaller than the angle $\xi$. The sealing edge 235 arranges that the angle v becomes as big as the angle $\xi$.

FIG. 13B shows the piston after the beginning of a stroke. The distance from the sealing edge 235 and the central axis 236 is $z_1$. The angle $\xi$ between the piston sealing edge 235 and the central axis 236 of the chamber. The angle v between the wall of the chamber and the central axis 236. The angle v is shown smaller than the angle $\xi$. The sealing edge 235 arranges that the angle v becomes as big as the angle $\xi$. Other embodiments of the piston are not shown.

FIG. 13C shows the piston during a stroke. The distance from the sealing edge 235 and the central axis 236 is $z_2$—this distance is smaller than $z_1$.

FIG. 13D shows the piston almost at the end of stroke. The distance from the sealing edge 235 and the central axis 236 is $z_3$—this distance is smaller than $z_2$.

Figure 14:
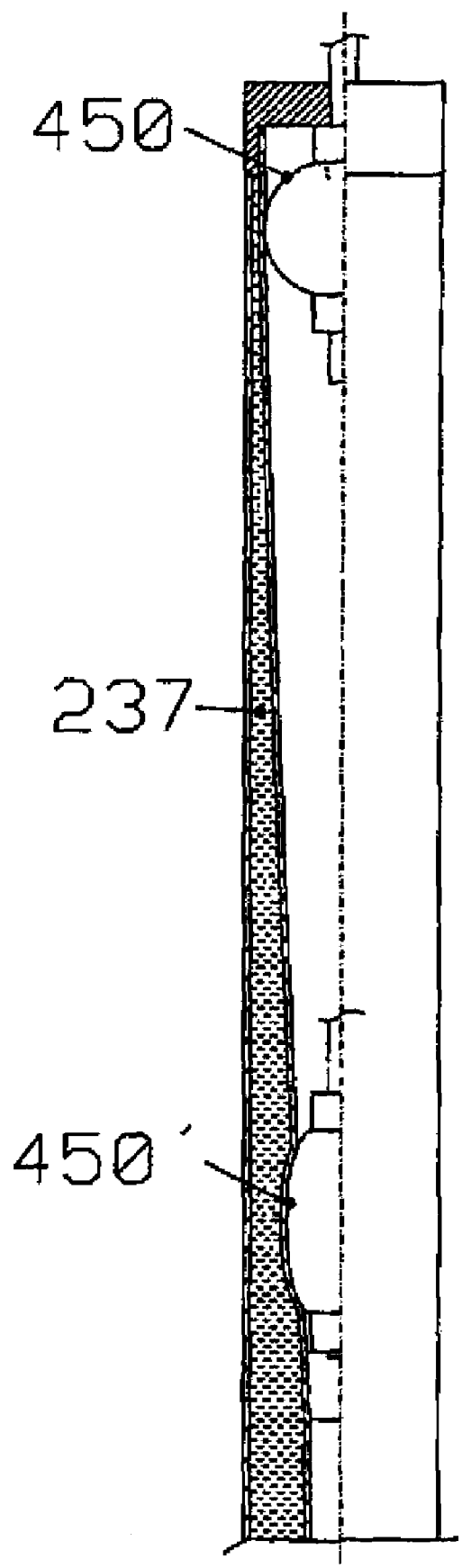
FIG. 14 shows a longitudinal cross-section of a chamber having a flexible wall with different areas of the transversal cross-sections and a piston with variable geometrical sizes—the arrangement of the combination is shown at the beginning, during a pump stroke and at the end of the stroke.

FIG. 14 shows a combination of a wall of the chamber and the piston which have changeable geometrical shapes, which adapt to each other during the pump stroke, enabling a continuous sealing. It has its production size at the second longitudinal position of the chamber. Shown is the chamber of FIG. 13A now with only a non-compressable medium 237 and piston 450 at the beginning of a stroke, while the piston 450' is shown just before the end of a stroke. Also all other embodiments of the piston which may change dimensions may be used here too. The right choice of velocity of the piston and the viscosity of the medium 237 may have a positive effect on operations. The longitudinal cross-sectional shape of the chamber shown in FIG. 14 may also be different.

The invention claimed is:

1. A piston-chamber combination comprising an elongate chamber which is bounded by an inner chamber wall, and comprising a piston in said chamber to be sealingly movable relative to said chamber wall at least between a first longitudinal position and a second longitudinal position of the chamber, said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position, said piston comprising a container which is elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position, and wherein the container contains a deformable material, the deformable material being a fluid or a foam.

2. A combination according to claim 1, wherein the foam or fluid is adapted to provide, within the container, a pressure higher than the highest pressure of the surrounding atmosphere during translation of the piston from the second longitudinal position of the chamber to the first longitudinal position thereof or vice versa.

3. A piston-chamber combination comprising an elongate chamber which is bounded by an inner chamber wall, and comprising a piston in said chamber to be sealingly movable relative to said chamber wall at least between a first longitudinal position and a second longitudinal position of the chamber, said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position, said piston comprising a container which is elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position, and wherein, the container contains a deformable material and in a cross-section through the longitudinal direction, the container, when being positioned at the first longitudinal position of the chamber, has a first shape which is different from a second shape of the container when being positioned at the second longitudinal position of said chamber.

4. A combination according to claim 3, wherein at least part of the deformable material is compressible and wherein the first shape has an area being larger than an area of the second shape.

5. A combination according to claim 3, wherein the deformable material is at least substantially incompressible.

6. A piston-chamber combination comprising an elongate chamber which is bounded by an inner chamber wall, and comprising a piston in said chamber to be sealingly movable relative to said chamber wall at least between a first longitudinal position and a second longitudinal position of the chamber, said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position, said piston comprising a container which is elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position, and wherein the container contains a deformable material and is inflatable, to a certain pre-determined pressure value.

7. A combination according to claim 6, wherein the pressure remains constant during the stroke.

8. A piston-chamber combination comprising an elongate chamber which is bounded by an inner chamber wall, and comprising a piston in said chamber to be sealingly movable relative to said chamber wall at least between a first longitudinal position and a second longitudinal position of the chamber,
   said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position,
   said piston comprising a container which is elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position,
   the piston comprising an enclosed space communicating with the deformable container, the enclosed space having a variable volume, the container containing a deformable material and the combination further comprising means for defining the volume of the enclosed space so that the pressure of fluid in the enclosed space relates to the pressure in a further enclosed space.

9. A combination according to claim 8, wherein the defining means are adapted to define the pressure in the enclosed space during the stroke.

10. A combination according to claim 8, wherein the defining means are adapted to define the pressure in the enclosed space at least substantially constant during the stroke.

11. A piston-chamber combination comprising an elongate chamber which is bounded by an inner chamber wall, and comprising a piston in said chamber to be sealingly movable relative to said chamber wall at least between a first longitudinal position and a second longitudinal position of the chamber,
   said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position,
   said piston comprising a container which is elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position,
   the piston comprising an enclosed space communicating with the deformable container, the enclosed space having a variable volume, the container containing a deformable material and
   the enclosed space comprising a spring-biased pressure tuning piston, the spring-biased pressure tuning piston including a check valve through which fluid of an external pressure source can flow into the enclosed space.

12. A combination according to claim 11, wherein the fluid from an external pressure source can enter the enclosed space through an inflation valve, preferably a valve with a core pin biased by a spring, such as a Schrader valve from an external pressure source.

13. A piston-chamber combination comprising an elongate chamber which is bounded by an inner chamber wall, and comprising a piston in said chamber to be sealingly movable relative to said chamber wall at least between a first longitudinal position and a second longitudinal position of the chamber,
   said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position,
   said piston comprising a container defining an enclosed space, the container being elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position wherein the piston includes at least one valve and wherein the valve is an inflation valve with a core pin biased by a spring.

14. A piston-chamber combination comprising an elongate chamber which is bounded by an inner chamber wall, and comprising a piston in said chamber to be sealingly movable relative to said chamber wall at least between a first longitudinal position and a second longitudinal position of the chamber,
- said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position,
- said piston comprising a container which is elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position,
- the piston comprising an enclosed space communicating with the deformable container, the enclosed space having a variable volume, the container containing a deformable material and
- the enclosed space comprising a spring-biased pressure tuning piston,
- wherein a foot of the chamber comprises at least one valve and the valve has a core pin biased by a spring, said core pin moving towards the chamber when closing the valve.

15. A piston-chamber combination comprising an elongate chamber which is bounded by an inner chamber wall, and comprising a piston in said chamber to be sealingly movable relative to said chamber wall at least between a first longitudinal position and a second longitudinal position of the chamber,
- said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position,
- said piston comprising a container which is elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position,
- the piston comprising an enclosed space communicating with the deformable container, the enclosed space having a variable volume, the container containing a deformable material and
- the enclosed space comprising a spring-biased pressure tuning piston, wherein the piston includes at least one valve and the valve is an inflation valve with a core pin biased by a spring, the core pin of the valve being connected to a valve actuator or an activating pin.

16. A combination according to claim 15, wherein the valve actuator for operating with at least one valve has a spring-force operated valve core pin, comprising
- a housing to be connected to a pressure medium source;
- within the housing
  - a coupling section for receiving the valve to be actuated,
  - a cylinder circumferentially surrounded by a cylinder wall of a predetermined cylinder wall diameter and having a first cylinder end and a second cylinder end which is farther away from the coupling section than said first cylinder end and is connected to the housing for receiving pressure medium from said pressure source,
  - a piston which is movably located in the cylinder and fixedly coupled to an activating pin for engaging with the spring-force operated valve core pin of the valve received in the coupling section, and
  - a conducting channel between said second cylinder end and said coupling section for conducting pressure medium from said second cylinder end to the coupling section when the piston is moved into a first piston position in which the piston is at a first predetermined distance from said first cylinder end, said conduction of pressure medium between said second cylinder end and the coupling section being inhibited when the piston is moved into a second piston position in which the piston is at a second predetermined distance from said first cylinder end which second distance being larger than said first distance,
- wherein
- the conducting channel is arranged in said cylinder wall and has a channel portion which opens into the cylinder at a cylinder wall portion having said predetermined cylinder wall diameter, and
- the piston comprises a piston ring with a sealing edge which sealingly fits with said cylinder wall portion, said sealing edge of the piston ring being located between said channel portion and said second cylinder end in said second piston position, thereby inhibiting said conduction of the pressure medium from said second cylinder end into the channel in said second piston position, and being located between said channel portion and said first cylinder end in said first piston position, thereby opening the channel to said second cylinder end in said first piston position.

17. A combination according to claim 16, wherein a spring-force operated cap which closes the channel above the valve actuator when the pressure comes above a certain pre-determined pressure value.

18. A combination according to claim 16, wherein the channel can be opened or closed, the channel connects the chamber and the space between the valve actuator and the core pin, a piston is movable between an opening position and a closing position of said channel, and the movement of the piston is controlled by an actuator which is steered as a result of a measurement of the pressure in the piston.

19. A combination according to claim 16, wherein the channel can be opened or closed, which connects the chamber and the space between the valve actuator and the core pin.

20. A combination according to claim 16, wherein the piston is movable between an opening position and a closing position of said channel.

21. A combination according to claim 20, wherein the piston is operated by a operator controlled pedal, which is turning around an axle from a inactive position to an activated position and vice versa.

22. A combination according to claim 20, wherein the piston is controlled by an actuator which is steered as a result of a measurement of the pressure in the piston.

23. A piston-chamber combination comprising an elongate chamber which is bounded by an inner chamber wall, and comprising a piston in said chamber to be sealingly movable relative to said chamber wall at least between a first longitudinal position and a second longitudinal position of the chamber,
    said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position,
    said piston comprising a container which is elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position,
    wherein the piston includes at least one valve and the piston comprising means to obtain a pre-determined pressure level.

24. A piston-chamber combination comprising an elongate chamber which is bounded by an inner chamber wall, and comprising a piston in said chamber to be sealingly movable relative to said chamber wall at least between a first longitudinal position and a second longitudinal position of the chamber,
    said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position,
    said piston comprising a container which is elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position,
    wherein the container contains a deformable material and the piston comprises an enclosed space communicating with the deformable container, the enclosed space having a variable volume, and
    the combination further comprising means for defining the volume of the enclosed space so that the pressure of fluid in the enclosed space relates to the pressure acting on the piston during the stroke.

25. A piston-chamber combination comprising an elongate chamber which is bounded by an inner chamber wall, and comprising a piston in said chamber to be sealingly movable relative to said chamber wall at least between a first longitudinal position and a second longitudinal position of the chamber,
    said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position,
    said piston comprising a container which is elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position, wherein the container contains a deformable material and comprises an elastically deformable material comprising reinforcement means.

26. A combination according to claim 25, wherein the reinforcement means are windings having a braid angle which is different from 54°44'.

27. A combination according to claim 25, wherein the reinforcement means comprise a textile reinforcement.

28. A combination according to claim 25, wherein the reinforcement means comprise fibres.

29. A combination according to claim 28, wherein the fibers are arranged as to the Trellis Effect.

30. A combination according to claim 25, wherein the reinforcement means comprises a flexible material positioned in the container, comprising a plurality of at least substantially elastic support members rotatably fastened to a common member, the common members connected to the skin of the container.

31. A combination according to claim 30, wherein said members and/or the common member are inflatable.

32. A combination according to claim 25, wherein a foam or fluid is adapted to provide, within the container, a pressure higher than the highest pressure of the surrounding atmosphere during translation of the piston from the second longitudinal position of the chamber to the first longitudinal position thereof or vice versa.

33. A piston-chamber combination comprising an elongate chamber bounded by an inner chamber wall and comprising a piston in the chamber to be sealingly movable in the chamber, the piston being movable in the chamber at least from a first longitudinal position thereof to a second longitudinal position thereof, the chamber comprising an elastically deformable inner wall along at least part of the length of the chamber wall between the first and second longitudinal positions, the chamber having, at the first longitudinal position thereof when the piston is positioned at that position, a first cross-sectional area, which is larger than a second cross-sectional area at the second longitudinal position of the chamber when the piston is positioned at that position, the change in cross-sections of the chamber being at least substantially continuous between the first and second longitudinal positions when the piston is moved between the first and second longitudinal positions the piston including an elastically expandable container having changeable geometrical shapes which adapts to the chamber inner wall during the piston stroke thereby enabling a continuous sealing, and the elastically expandable container having a stress free circumferential length equal to a circumferential length of the inner wall at the second longitudinal position of the chamber.

34. A combination according to claim 33, wherein the piston is made of an at least substantially incompressible material.

35. A combination according to claim 33, wherein the piston has, in a cross section along the longitudinal axis, a shape tapering in a direction from the first longitudinal position of the chamber to the second longitudinal position thereof.

36. A combination according to claim 35, wherein the angle (v) between the wall and the central axis of the cylinder is at least smaller than the angle (u) between the wall of the taper of the piston and the central axis of the chamber.

37. A combination according to claim 33, wherein the chamber comprises: an outer supporting structure enclosing the inner wall and a fluid held by a space defined by the outer supporting structure and the inner wall.

38. A combination according to claim 37, wherein the space defined by the outer structure and the inner wall is inflatable.

39. A combination according to claim 33, wherein the piston comprises an elastically deformable container comprising a deformable material.

40. A pump for pumping a fluid, the pump comprising: a combination according to claim 33, including, means for engaging the piston from a position outside the chamber, a fluid entrance connected to the chamber and comprising a valve means, and a fluid exit connected to the chamber.

41. A pump according to claim 40, wherein the engaging means have an outer position where the piston is at the first longitudinal position of the chamber, and an inner position where the piston is at the second longitudinal position of the chamber.

42. A pump according to claim 40, wherein the engaging means have an outer position where the piston is at the second longitudinal position of the chamber, and an inner position where the piston is at the first longitudinal position of the chamber.

43. A piston-chamber combination comprising an elongate chamber which is bounded by an inner chamber wall, and comprising a piston in said chamber to be sealingly movable relative to said chamber wall at least between a first longitudinal position and a second longitudinal position of the chamber, said chamber having cross-sections of different cross-sectional areas and different circumferential lengths at the first and second longitudinal positions, and at least substantially continuously different cross-sectional areas and circumferential lengths at intermediate longitudinal positions between the first and second longitudinal positions, the cross-sectional area and circumferential length at said second longitudinal position being smaller than the cross-sectional area and circumferential length at said first longitudinal position, said piston comprising a container which is elastically deformable thereby providing for different cross-sectional areas and circumferential lengths of the piston adapting the same to said different cross-sectional areas and different circumferential lengths of the chamber during the relative movements of the piston between the first and second longitudinal positions through said intermediate longitudinal positions of the chamber, wherein the piston is produced to have a production-size of the container in the stress-free and undeformed state thereof in which the circumferential length of the piston is approximately equivalent to the circumferential length of said chamber at said second longitudinal position, the container being expandable from its production size in a direction transversely with respect to the longitudinal direction of the chamber thereby providing for an expansion of the piston from the production size thereof during the relative movements of the piston from said second longitudinal position to said first longitudinal position, means for engaging the piston from a position outside the chamber, means for introducing fluid into the chamber in order to displace the piston between the first and the second longitudinal positions of the chamber, and wherein the introducing means are adapted to introduce a combustible fluid, such as gasoline or diesel, into the chamber, and wherein the actuator further comprises means for combusting the combustible fluid.

* * * * *